United States Patent
Jibiki et al.

(10) Patent No.: US 9,384,866 B2
(45) Date of Patent: Jul. 5, 2016

(54) POLYANILINE COMPOSITE, METHOD FOR PRODUCING SAME, AND COMPOSITION

(75) Inventors: Yosuke Jibiki, Sodegaura (JP); Toru Bando, Sodegaura (JP); Sumihiro Oda, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 361 days.

(21) Appl. No.: 13/982,054

(22) PCT Filed: Jan. 24, 2012

(86) PCT No.: PCT/JP2012/000413
§ 371 (c)(1),
(2), (4) Date: Sep. 24, 2013

(87) PCT Pub. No.: WO2012/102017
PCT Pub. Date: Aug. 2, 2012

(65) Prior Publication Data
US 2014/0008582 A1     Jan. 9, 2014

(30) Foreign Application Priority Data
Jan. 27, 2011 (JP) ................. 2011-014740

(51) Int. Cl.
*H01B 1/00* (2006.01)
*H01B 1/12* (2006.01)
(Continued)

(52) U.S. Cl.
CPC ............... *H01B 1/128* (2013.01); *C08L 79/02* (2013.01); *C08K 5/42* (2013.01)

(58) Field of Classification Search
CPC ............... C08G 73/0266; H01B 1/128; Y10T 428/31786

USPC ................................. 252/500; 528/422
See application file for complete search history.

(56) References Cited

U.S. PATENT DOCUMENTS

| 2003/0091845 A1 | 5/2003 | Pron et al. |
| 2006/0278854 A1 | 12/2006 | Pron et al. |

(Continued)

FOREIGN PATENT DOCUMENTS

| CN | 1466606 A | 1/2004 |
| CN | 101809065 A | 8/2010 |

(Continued)

OTHER PUBLICATIONS

Combined Chinese Office Action and Search Report issued on Jul. 29, 2014, in Patent Application No. 201280006731.6 with English translation of category of cited documents.

(Continued)

*Primary Examiner* — Khanh Tuan Nguyen
(74) *Attorney, Agent, or Firm* — Oblon, McClelland, Maier & Neustadt, L.L.P.

(57) ABSTRACT

A polyaniline composite including substituted or unsubstituted polyaniline molecules and a proton donar, the polyaniline molecules being doped with the proton donar, the composite having a chlorine content of 0.6 wt % or less and the composite satisfying the following formula (1):

$$P_{10000}/P_{ALL} \leq 0.15 \quad (1)$$

wherein $P_{10000}$ is the total sum of the weights of the polyaniline molecules contained in the polyaniline composite having a molecular weight of 10000 or less; and $P_{ALL}$ is the total sum of the weights of all polyaniline molecules contained in the polyaniline composite.

22 Claims, 2 Drawing Sheets

(51) Int. Cl.
*C08L 79/02* (2006.01)
*C08K 5/42* (2006.01)

(56) References Cited

U.S. PATENT DOCUMENTS

| | | |
|---|---|---|
| 2007/0108420 A1 | 5/2007 | Kuramoto |
| 2009/0011226 A1 | 1/2009 | Takeuchi et al. |
| 2011/0012065 A1 | 1/2011 | Kuramoto et al. |

FOREIGN PATENT DOCUMENTS

| | | |
|---|---|---|
| JP | 62-149724 | 7/1987 |
| JP | 62-230825 | 10/1987 |
| JP | 7-70312 | 3/1995 |
| JP | 2001-288264 | 10/2001 |
| JP | 2003-011270 A | 1/2003 |
| JP | 2003-183389 | 7/2003 |
| JP | 2005-314639 | 11/2005 |
| JP | 2008-075039 A | 4/2008 |
| JP | 2008-163062 | 7/2008 |
| JP | 200829624 A | 7/2008 |
| JP | 2009-84323 | 4/2009 |
| TW | 200711839 A | 4/2007 |
| TW | 200948898 A | 12/2009 |
| WO | WO 02/40570 A1 | 5/2002 |
| WO | WO 2005/052058 A1 | 6/2005 |
| WO | WO 2005/108465 A1 | 11/2005 |
| WO | WO 2008/038609 A1 | 4/2008 |
| WO | WO 2009/084419 A1 | 7/2009 |

OTHER PUBLICATIONS

Japanese Office Action issued May 12, 2015 in Patent Application No. 2012-554677 (without English Translation).
Combined Taiwanese Office Action and Search Report issued May 14, 2015 in Patent Application No. 101102909 (with English Translation of Category of Cited Documents).
International Preliminary Report on Patentability issued Aug. 8, 2013 Ii PCT/JP2012/000413 filed on Jan. 24, 2012.
Written Opinion issued May 1, 2012 in PCT/JP2012/000413 filed on Jan. 24, 2012.
International Search Report issued May 1, 2012 in PCT/JP2012/000413.
Yong Cao, et al., "Counter-ion Induced processibility of conducting polyaniline and of conducting polyblends of polyaniline in bulk polymers", Synthetic Metals, An International Journal Integrating Research and Applications on Intercalation Compounds of Graphite, Transition Metal Compounds, and Quasi One-Dimensional Conductors, vol. 48, No. 1, 1992, pp. 91-97.
P. N. Adams, et al., "A new acid-processing route to polyaniline films which exhibit metallic conductivity and electrical transport strongly dependent upon intrachain molecular dynamics", Journal of Physics, Condensed Matter, vol. 10, No. 21, 1998, pp. 8293-8303.
Yong Cao, et al. "Influence of chemical polymerization conditions on the properties of polyaniline", Polymer, the international journal for the science and technology of polymers, 1989, vol. 30, No. 12, pp. 2305-2311.
Office Action issued Jul. 1, 2014 in Korean Patent Application No. 10-2013-7019881.
Extended European Search Report issued Oct. 1, 2014 in Patent Application No. 12739305.6.

US 9,384,866 B2

POLYANILINE COMPOSITE, METHOD FOR PRODUCING SAME, AND COMPOSITION

CROSS REFERENCE TO RELATED APPLICATIONS

The present application is a 35 U.S.C. §371 national stage patent application of International patent application PCT/JP2012/000413, filed on Jan. 24, 2012, published as WO/2012/102017 on Aug. 2, 2012, the text of which is incorporated by reference, and claims the benefit of the filing date of Japanese application no. 2011-014740, filed on Jan. 27, 2011, the text of which is also incorporated by reference.

TECHNICAL FIELD

The invention relates to a novel polyaniline composite and the production method thereof. The invention also relates to a conductive composition using the polyaniline composite and a capacitor and a shaped body obtained therefrom.

BACKGROUND ART

As the conductive polymer, polyaniline or the like are well known. In addition to its electrical properties, polyaniline has advantages that it can be synthesized relatively easily from inexpensive aniline and shows excellent stability to air or the like in the state in which it shows conductivity.

As the method for producing polyaniline, a method in which aniline or an aniline derivative is subjected to oxidative electropolymerization or chemical oxidative polymerization is known.

As for the oxidative electropolymerization, a method in which aniline is polymerized on an electrode is stated in Patent Document 1 or Patent Document 2. A film which is improved in electric properties or the like can be obtained in the oxidative electropolymerization. In general, oxidative electropolymerization is high in production cost as compared with chemical oxidative polymerization, and hence, is not suited to mass production. In addition, by oxidative electropolymerization, it is difficult to obtain a shaped body having a complex shape.

On the other hand, in order to obtain a conductive polymer such as aniline or an aniline derivative by chemical oxidative polymerization, a step in which a dopant (doping agent) is added to polyaniline in a non-conductive basic state (so-called Emeraldine base state) to conduct protonation is required. However, since polyaniline in a non-conductive basic state is hardly dissolved in most of organic solvents, it is not suited to industrial production. Further, a conductive polyaniline composite (so-called Emeraldine base state) generated after protonation is substantially not dissolved and not molten, and hence, it is difficult to produce a conductive composite material and its shaped body easily.

Under such circumstances, as a method for improving doping properties of polyaniline in the non-conductive basic state as well as for improving affinity for an inorganic solvent of conductive polyaniline after the doping, several methods have been proposed.

For example, Non-Patent Document 1 discloses that polyaniline exhibits excellent electric properties by using as a dopant a protonic acid which has affinity for an organic solvent such as dodecylbenzenesulfonic acid and camphorsulfonic acid (CSA). Patent Document 3 discloses a method in which polyaniline in the non-conductive basic state is dissolved in m-cresol using, for example, adamantanesulfonic acid as a dopant. Non-Patent Document 2 discloses a method in which polyaniline in the non-conductive basic state is doped in a specific solvent (a halogen-based strong acid) such as 2,2-dichloroacetic acid using 2-acrylamide-2-methyl-propanesulfonic acid as a dopant. Patent Document 4 discloses, as in the case of Non-Patent Document 2, discloses a method in which polyanilline in the non-conductive basic state is doped by using 2,2-dichloroacetic acid as a solvent and a di(2-ethylhexyl)ester of sulfosuccinic acid as a dopant.

However, a shaped body formed of conductive polyaniline obtained by the method disclosed in Patent Document Nos. 1 to 4 and Non-Patent Document Nos. 1 and 2 was not necessarily excellent in electric properties such as electric conductivity.

In order to improve the conductivity of a shaped body formed of conductive polyaniline, Patent Document 5 discloses a conductive polyaniline composition comprising a compound having (a) a substituted or unsubstituted polyaniline composite which has been protonated, which is dissolved in an organic solvent which is not substantially miscible with water, and (b) a phenolic hydroxyl group. Further, Patent Document 5 discloses that the amount of the (b) phenolic compound is normally 0.01 to 1000 mass %, preferably 0.5 to 500 mass %, relative to the amount of (a) the protonated substituted or unsubstituted polyaniline composite. Further, Patent Document 5 discloses a method in which polymerization of aniline is conducted by dissolving sodium diisooctyl sulfosuccinate and aniline in toluene, adding hydrochloric acid, cooling the flask on ice bath, and adding a solution obtained by dissolving ammonium persulfate in hydrochloric acid dropwise.

The reason that polymerization of aniline is conducted in the presence of hydrochloric acid in Patent Document 5 is that a higher degree of conductivity can be obtained when conductive polyaniline is synthesized in the presence of hydrochloric acid. Further, Non-Patent Document 3 discloses that the conductive polyaniline having a high molecular weight cannot be obtained as long as polymerization of aniline is conducted in the presence of hydrochloric acid.

In general, in a polymer material, there is a close relationship between the molecular weight and the material properties. For example, when a film is formed, the film strength is higher if a polymer material having a high molecular weight is used. As mentioned above, in polyaniline, an industrially advantageous material can be obtained when polymerization is conducted by using hydrochloric acid. On the other hand, in the field of electronic parts, chlorine-free materials are required since metal parts of electronic parts may corrode if materials containing chlorine is used and since the worldwide trend for reinforcement of environmental regulation has been strengthened in recent years. Hence, the dissolution-type polyaniline composite in Patent Document 5 has a problem that it has a high chlorine content.

RELATED ART DOCUMENTS

Patent Documents

Patent Document 1: JP-A-S62-230825
Patent Document 2: JP-A-S62-149724
Patent Document 3: JP-A-H07-70312
Patent Document 4: JP-A-2003-183389
Patent Document 5: WO05/052058

Non-Patent Documents

Non-Patent Document 1: Synthetic metals, 48, 1992, pages 91 to 97
Non-Patent Document 2: J. Phys.: Condens. Matters, 10, 1998, pages 8293 to 8303
Non-Patent Document 3: POLYMER: 30, 1989, 2305-2311

SUMMARY OF THE INVENTION

An object of the invention is to provide a dissolution-type polyaniline composite having a small chlorine content which is capable of producing a conductive composition having a high conductivity.

The inventors have found that, while a polyaniline composite obtained in the presence of phosphoric acid without using an emulsifier in a solution having two liquid phases contains a large amount of polyaniline molecules having a low molecular weight, and does not have a high conductivity as compared with a polyaniiline composite obtained in the presence of hydrochloric acid, a polyaniline composite obtained in the presence of phosphoric acid by using an emulsifier in a solution having two liquid phases does not contain a large amount of polyaniline molecules having a low molecular weight, and has a high conductivity. The invention has been made based on this finding.

According to the invention, the following polyaniline composite or the like can be provided.

1. A polyaniline composite comprising substituted or unsubstituted polyaniline molecules and a proton donar, the polyaniline molecules being doped with the proton donar, the composite having a chlorine content of 0.6 wt % or less and the composite satisfying the following formula (1):

$$P_{10000}/P_{ALL} \leq 0.15 \quad (1)$$

wherein $P_{10000}$ is the total sum of the weights of the polyaniline molecules contained in the polyaniline composite having a molecular weight of 10000 or less; and $P_{ALL}$ is the total sum of the weights of all polyaniline molecules contained in the polyaniline composite.

2. The polyaniline composite according to 1, wherein the weight average molecular weight of the polyaniline molecules is 52000 or more.

3. The polyaniline composite according to 1 or 2, wherein the proton donar is a compound represented by the following formula (I):

$$M(XARn)m \quad (I)$$

wherein M is a hydrogen atom, an organic free radical or an inorganic free radical; and m is a value of "the valence of M/the valence of X";

X is an anion group;

A is a hydrocarbon group which may comprise a substituent;

R is a group represented by —H, —$R^1$, —$OR^1$, —$COR^1$, —$COOR^1$, —(C=O)—($COR^1$) or —(C=O)—($COOR^1$);

$R^1$ is a hydrocarbon group which may have a substituent, a silyl group, an alkylsilyl group, a group represented by —($R^2$O)x-$R^3$ or a group represented by —($OSiR^3{}_2$)x-$OR^3$ ($R^2$ is independently an alkylene group, $R^3$ is independently a hydrocarbon group and x is an integer of 1 or more; and n is an integer of 1 or more.

4. The polyaniline composite according to any of 1 to 3, wherein the proton donar is a compound represented by the following formula (III):

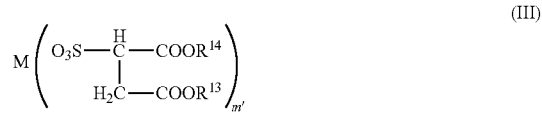

wherein M is a hydrogen atom, an organic free radical or an inorganic free radical and m' is a valence of M;

$R^{13}$ and $R^{14}$ are independently a hydrocarbon group or a group represented by —($R^{15}$O)r-$R^{16}$;

$R^{15}$ is independently a hydrocarbon group or a silylene group, $R^{16}$ is a hydrogen atom, a hydrocarbon group or a group represented by $R^{17}{}_3$Si—, and r is an integer of 1 or more; and $R^{17}$ is independently a hydrocarbon group.

5. The polyaniline composite according to any of 1 to 4, which is dissolved in an amount of 1 g or more in a mixed solvent of 95 g of toluene and 5 g of isopropyl alcohol at 25° C.

6. The polyaniline composite according to any of 1 to 5, which further comprises phosphor.

7. A method for producing a polyaniline composite comprising subjecting substituted or unsubstituted aniline to chemical oxidative polymerization in a solution comprising a proton donar, phosphoric acid and an emulsifier which is different from the proton donar and having two liquid phases.

8. The method for producing a polyaniline composite according to 7, wherein the proton donar is a compound represented by the following formula (I):

$$M(XARn)m \quad (I)$$

wherein M is a hydrogen atom, an organic free radical, or an inorganic free radical; and m is a value of "the valence of M/the valence of X";

X is an anion group;

A is a hydrocarbon group which may contain a substituent;

R is a group represented by —H, —$R^1$, —$OR^1$, —$COR^1$, —$COOR^1$, —(C=O)—($COR^1$) or —(C=O)—($COOR^1$);

$R^1$ is a hydrocarbon group which may have a substituent, a silyl group, an alkylsilyl group which may have a substituent, a group represented by —($R^2$O)x-$R^3$ or a group represented by —($OSiR^3{}_2$)x-$OR^3$ ($R^2$ is independently an alkylene group, $R^3$ is independently a hydrocarbon group and x is an integer of 1 or more; and n is an integer of 1 or more.

9. The method for producing a polyaniline composite according to 7 or 8, wherein the proton donar is represented by the following formula (III):

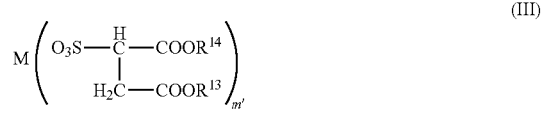

wherein M is a hydrogen atom, an organic free radical or an inorganic free radical; and m' is a valence of M;

$R^{13}$ and $R^{14}$ are independently a hydrocarbon group or a group represented by —($R^{15}$O)r-$R^{16}$;

$R^{15}$ is independently a hydrocarbon group or a silylene group, $R^{16}$ is a hydrogen atom, a hydrocarbon group or a group represented by $R^{17}{}_3$Si— and r is an integer of 1 or more; and $R^{17}$ is independently a hydrocarbon group.

10. A polyaniline composite obtained by the method according to any of 7 to 9.

11. A composition comprising the polyaniline composite according to any of 1 to 6 and 10 and a solvent.

12. The composition according to 11, which further comprises a phenolic compound.

13. The composition according to 11 or 12, which further comprises a heat-resistant stabilizer.

14. A capacitor comprising the polyaniline composite according to any of 1 to 6 and 10.

15. A capacitor produced by using the composition according to any of 11 to 13.

16. A shaped body comprising the polyanilline composite according to any of 1 to 6 and 10.

17. A shaped body produced by using the composition according to any of 11 to 13.

18. A conductive stacked body comprising a substrate and a conductive layer comprising the polyaniline composite according to any of 1 to 6 and 10, the conductive layer being stacked on the substrate.

19. A conductive stacked body comprising a substrate and a conductive layer produced by using the composition according to any of 11 to 13, the conductive layer being stacked on the substrate.

20. A conductive article obtained by shaping the conductive stacked body according to 18 or 19.

According to the invention, it is possible to provide a dissolution-type polyaniline composite having a small chlorine content and is capable of obtaining a conductive composition having a high conductivity.

MODE FOR CARRYING OUT THE INVENTION

Figure 1:
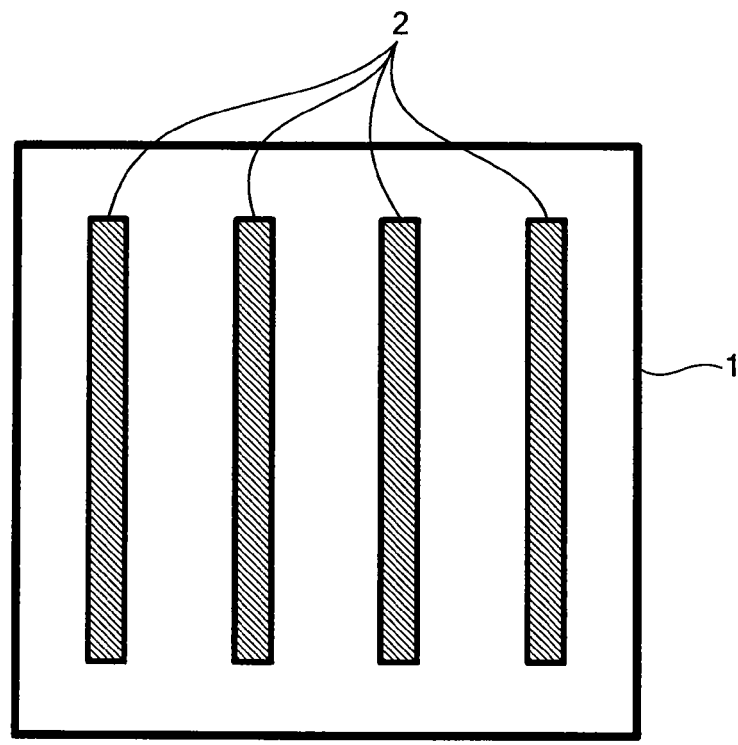
FIG. 1 is a view showing the upper surface of a glass substrate having an indium tin oxide (ITO) electrode being formed thereon.

The polyaniline composite of the invention comprises a substituted or unsubstituted polyaniline molecules and a proton donar, the polyaniline molecules being doped with the proton donar, the composite having a chlorine content of 0.6 wt % or less and the composite satisfying the following formula (1):

$$P_{10000}/P_{ALL} \leq 0.15 \tag{1}$$

wherein $P_{10000}$ is the total sum of the weights of the polyaniline molecules contained in the polyaniline composite having a molecular weight of 10000 or less; and $P_{ALL}$ is the total sum of the weights of all polyaniline molecules contained in the polyaniline composite.

[Polyaniline Molecules]

That the substituted or unsubstituted polyaniline molecules of the polyaniline composite satisfy the above-mentioned formula (1) means that the total weight of the substituted or unsubstituted polyaniline molecules having a molecular weight of 10000 or less relative to the total weight of polyaniline molecules in the polyaniline composite is 15% or less. By reducing the amount ratio of the substituted or unsubstituted polyaniline molecules having a molecular weight of 10000 or less in the polyaniline composite, the polyaniline composite of the invention can exhibit excellent conductivity.

If the total weight of the substituted or unsubstituted polyaniline molecules having a molecular weight of 10000 or less exceeds 15%, a high conductivity cannot be obtained.

As shown by the following formula, it is preferred that the total weight of the substituted or unsubstituted polyaniline molecules having a molecular weight of 10000 or less be 12% or less, with 10% or less being further preferable.

$$P_{10000}/P_{ALL} \leq 0.12$$

$$P_{10000}/P_{ALL} \leq 0.10$$

wherein $P_{10000}$ and $P_{ALL}$ are as defined in the formula (1).

Although the lower limit of $P_{10000}/P_{ALL}$ is not particularly restricted, it is 0.01% or 0.1%, for example.

The molecular weight of the polyaniline molecules can be measured by the following method, for example.

0.25 g of the polyaniline composite is dissolved in 5 g of toluene. 10 mL of an aqueous 1M sodium hydroxide solution is added, and the mixture is stirred for 15 minutes. Thereafter, the mixture is subjected to suction filtration. The resulting residue is washed with 10 mL of toluene three times, 10 mL of ion exchange water three times and 10 mL of methanol three times. The resulting solid matters were dried under reduced pressure and the molecular weight of the obtained polyaniline molecule is measured by GPC.

The molecular weight obtained by the above method is a polystyrene (PS)-converted value.

The polyaniline molecules have a weight-average molecular weight of preferably 10,000 or more, more preferably 20,000 or more, further preferably 30,000 or more and 1,000,000 or less, more further preferably 40,000 or more and 1,000,000 or less, with 52,000 or more and 1,000,000 or less being most preferable.

If the weight average molecular weight of the polyaniline molecule is less than 10,000, the strength or stretchability of a conductive article obtained from the composition comprising the polyaniline molecule may be lowered.

The molecular weight distribution of the polyaniline molecule is preferably 1.5 or more and 20.0 or less, more preferably 1.5 or more and 5.0 or less, further preferably 1.5 or more and 4.5 or less, particularly preferably 1.5 or more and 4.0 or less, with 1.5 or more and 3.6 or less being most preferable.

The above-mentioned molecular weight distribution is a value represented by the weight-average molecular weight/the number-average molecular weight, and in respect of conductivity, it is preferred that the molecular weight distribution be small. The weight-average molecular weight and the molecular weight distribution mentioned above are obtained as a polystyrene-converted value measured by a gel permeation chromatograph (GPC).

In respect of versatility and economy, the substituted or unsubstituted polyaniline molecule of the polyaniline composite is preferably an unsubstituted polyaniline.

As the substituent of the substituted polyaniline molecules, a straight-chain or branched hydrocarbon group such as a methyl group, an ethyl group, a hexy group or an octyl group: an alkoxy group such as a methoxy group and an ethoxy group; an aryloxy group such as a phenoxy group; and a halogenated hydrocarbon group such as a trifluoromethyl group ($-CF_3$ group) or the like.

The substituted or unsubstituted polyaniline molecules are preferably polyaniline molecules obtained by polymerization in the presence of an acid containing no chlorine atom. The acid containing no chlorine atom is an acid comprising elements belonging to the $1^{st}$ to $16^{th}$ and $18^{th}$ of the periodic table, for example. Polyaniline molecules obtained by polymerizing in the presence of phosphoric acid can be given.

Polyaniline molecules obtained in the presence of an acid which does not contain a chlorine atom enable the chlorine content in the polyaniline composite to be further lowered.

[Proton Donar]

The fact that substituted or unsubstituted polyaniline molecules are doped with the proton donar can be confirmed by ultraviolet, visible, near-infrared spectroscopy or X-ray photoelectron spectroscopy. The proton donar can be used without structural restrictions as long as it has sufficient acidity which is enough for generating carriers on the polyaniline molecules.

As the proton donar, Bronstead acid or its salts can be given, for example. An organic acid and its salts are preferable, with a proton donar represented by the following formula (I) are being further preferable.

$$M(XARn)m \quad (I)$$

M in the formula (I) is a hydrogen atom, an organic free radical or an inorganic free radical.

As examples of the organic free radical, a pyridinium group, an imidazolium group and an anilinium group can be given, for example. As the above-mentioned inorganic free radical group, lithium, sodium, potassium, cesium, ammonium, calcium, magnesium and iron can be given, for example.

X in the formula (I) is an anionic group, and examples thereof include a $-SO_3^-$ group, a $-PO_3^{2-}$ group, a $-PO_4(OH)^-$ group, a $-OPO_3^{2-}$ group, a $-OPO_2(OH)^-$ group and $-COO-$ group can be given. Of these, $-SO_3^-$ group is preferable.

A in the formula (I) (that is the definition of A in M(XARn)m) is a substituted or unsubstituted hydrocarbon group.

The hydrocarbon group is a chain-like or cyclic saturated aliphatic hydrocarbon group, a linear or cyclic unsaturated aliphatic hydrocarbon group or an aromatic hydrocarbon group.

As examples of the chain-like saturated aliphatic hydrocarbon, a linear or branched alkyl group can be given. As the cyclic saturated aliphatic hydrocarbon group, a cycloalkyl group such as a cyclopentyl group, a cyclohexyl group, a cycloheptyl group and a cyclooctyl group can be given. The cyclic saturated aliphatic hydrocarbon group may be one obtained by fusing of a plurality of cyclic saturated aliphatic hydrocarbon groups. A norbornyl group, an adamantyl group and a fused adamantyl group can be given. As the aromatic hydrocarbon group, a phenyl group, a naphthyl group and an anthracenyl group can be given. As the chain-like unsaturated aliphatic hydrocarbon, a linear or branched alkenyl group can be given.

Here, as the substituent when A is a substituted hydrocarbon group, an alkyl group, a cycloalkyl group, a vinyl group, an allyl group, an aryl group, an alkoxy group, a halogen group, a hydroxyl group, an amino group, an imino group, a nitro group, a silyl group or an ester group can be given.

R in the formula (I) bonds to A, and is independently a substituent presented by $-H$, $-R^1$, $-OR^1$, $-COR^1$, $-COOR^1$, $-(C=O)-(COR^1)$ or $-(C=O)-(COOR^1)$, and $R^1$ is a hydrocarbon group which may have a substituent, a silyl group, an alkylsilyl group, $-(R^2O)x-R^3$ group or $-(OSiR^3_2)x-OR^3$ ($R^2$ is independently an alkylene group, $R^3$ is independently a hydrocarbon group and x is an integer of 1 or more).

As the hydrocarbon group presented by $R^1$, a methyl group, an ethyl group, a straight-chain or branched butyl group, a pentyl group, a hexyl group, a heptyl group, an octyl group, a nonyl group, a decyl group, a dodecyl group, a pentadecyl group, an eicosanyl group or the like can be given. The substituent of the hydrocarbon group is an alkyl group, a cycloalkyl group, a vinyl group, an ally group, an aryl group, an alkoxy group, a halogen group, a hydroxy group, an amino group, an imino group, a nitro group or an ester group. The hydrocarbon group of $R^3$ is the same as $R^1$.

As the alkylene group of $R^2$, a methylene group, an ethylene group, a propylene group or the like can be given, for example.

n in the formula (I) is an integer of 1 or more and m in the formula (I) is a valence of M/valence of X.

As the compound represented by the formula (I), dialkylbenzenesulfonic acid, dialkylnaphthalenesulfonic acid or a compound having two or more ester bonds are preferable.

As the above-mentioned compound having two or more ester bonds, a sulfophthalic ester or a compound represented by the following formula (II) is more preferable.

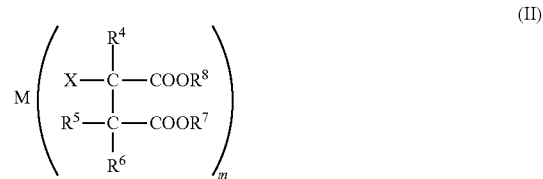

wherein M and X are as defined in the formula (I). X is preferably a $-SO_3^-$ group.

$R^4$, $R^5$ and $R^6$ in formula (II) are independently a hydrogen atom, a hydrocarbon group or an $R^9_3$Si-group (wherein $R^9$ is a hydrocarbon group and three $R^9$s may be the same or different from each other).

As the hydrocarbon group when $R^4$, $R^5$ and $R^6$ are hydrocarbon groups, a linear or branched alkyl group having 1 to 24 carbon atoms, an aryl group containing an aromatic ring, an alkylaryl group or the like can be given.

The hydrocarbon group represented by $R^9$ is the same as that of $R^4$, $R^5$ and $R^6$.

$R^7$ and $R^8$ in the formula (II) are independently a hydrocarbon group or $-(R^{10}O)_q-R^{11}$ group (wherein $R^{10}$ is a hydrocarbon group or a silylene group, $R^{11}$ is a hydrogen atom, a hydrocarbon group or $R^{12}_3$Si—)$R^{12}$ is a hydrocarbon group, three $R^{12}$s may be the same or different from each other and q is an integer of 1 or more).

As the hydrocarbon group when $R^7$ and $R^8$ are hydrocarbon groups, a linear or branched alkyl group having 1 to 24, preferably 4 or more carbon atoms, an aryl group containing an aromatic ring, an alkylaryl group or the like, alkyl groups, and as specific examples of the hydrocarbon group when $R^7$ and $R^8$ are hydrocarbon groups, a straight-chain or branched butyl group, a pentyl group, a hexyl group, an octyl group, a decyl group or the like can be given.

As the hydrocarbon group when $R^{10}$ is a hydrocarbon group in $R^7$ and $R^8$, a linear or branched alkylene group having 1 to 24 carbon atoms, an arylene group containing an aromatic ring, an alkylarylene group and an arylalkylene group can be given, for example. Further, as the hydrocarbon group when $R^{11}$ and $R^{12}$ are hydrocarbon groups in $R^7$ and $R^8$, the same can be given as those for $R^4$, $R^5$ and $R^6$, and q is preferably 1 to 10.

Specific examples of a compound represented by the formula (II) in which $R^7$ and $R^8$ are a $-(R^{10}O)_q-R^{11}$ group include two compounds represented by the following formulas:

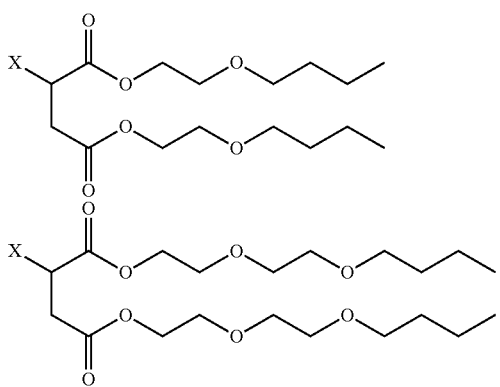

wherein X is as defined in the formula (I).

It is more preferred that the compound represented by the above formula (II) be a sulfosuccinic acid derivative represented by the following formula (III):

wherein M is as defined in the formula (I); and m' is a valence of M.

$R^{13}$ and $R^{14}$ in the formula (III) are independently a hydrocarbon group or a $-(R^{15}O)_r-R^{16}$ group (wherein $R^{15}$ is independently a hydrocarbon group or a silylene group, $R^{16}$ is a hydrogen atom, a hydrocarbon group or a $R^{17}_3$Si-group (wherein $R^{17}$ is independently a hydrocarbon group) and r is an integer of 1 or more).

As the hydrocarbon group when $R^{13}$ and $R^{14}$ are hydrocarbon groups, the same can be given for $R^7$ and $R^8$.

As the hydrocarbon group when $R^{15}$ is a hydrocarbon group in $R^{13}$ and $R^{14}$, the same can be given for $R^{10}$ mentioned above. As the hydrocarbon group when $R^{16}$ and $R^{17}$ are hydrocarbon groups in $R^{13}$ and $R^{14}$, the same can be given for $R^4$, $R^5$ and $R^6$ mentioned above.

It is preferred that r be 1 to 10.

As specific examples when $R^{13}$ and $R^{14}$ are a $-(R^{15}O)_r-R^{16}$ group, the same can be given for $-(R^{16}O)_q-R^{11}$ in $R^7$ and $R^8$.

As the hydrocarbon group of $R^{13}$ and $R^{14}$, the same can be given for $R^7$ and $R^8$, and a butyl group, a hexyl group, a 2-ethylhexyl group, a decyl group or the like are preferable.

It is known that, by changing the structure thereof, the proton donor can control conductivity of the polyaniline composite or solubility in a solvent (U.S. Pat. No. 3,384,566). In the invention, the optimum proton donar can be selected according the required properties that vary depending on the intended use.

The doping ratio of the proton donor to the polyaniline molecules is preferably 0.35 or more and 0.65 or less, more preferably 0.42 or more and 0.60 or less, further preferably 0.43 or more and 0.57 or less, with 0.44 or more and 0.55 or less being particularly preferable. When the doping ratio is less than 0.35, there is a possibility that the solubility of the polyaniline composition in an organic solvent may not be increased.

The doping ratio is defined by (the number of moles of proton donar with which the polyaniline molecules are doped)/(the number of moles of the monomer unit of polyaniline). For example, the doping ratio of the polyaniline composite comprising unsubstituted polyaniline and a proton donar is 0.5 means two monomer unit molecules of the polyaniline are doped with one proton donar.

Meanwhile, the doping ratio can be calculated if the number of moles of the proton donor in the polyaniline composite and the number of moles of the monomer unit in the polyaniline molecules can be measured. For example, if the proton donar is an organic sulfonic acid, the number of moles of a sulfur atom derived from the proton donar and the number of moles of a nitrogen atom derived from the monomer unit of the polyaniline are quantified by the organic element analysis method, and the doping ratio can be calculated by taking the ratio of these values. However, the method for calculating the doping ratio is not restricted to this method.

It is preferred that the polyaniline composite comprise unsubstituted polyaniline molecules and sulfonic acid as the proton donar and satisfy the following formula (5):

$$0.42 \leq S_5/N_5 \leq 0.60 \quad (5)$$

wherein $S_5$ is the total of the number of moles of sulfur atoms contained in the polyaniline composite and $N_5$ is the total of the number of moles of nitrogen atoms contained in the polyaniline composite.

Meanwhile, the number of moles of the above-mentioned nitrogen atom and the sulfur atom is a value measured by the organic elemental analysis method, for example.

[Polyaniline Composite]

The chlorine content of the polyaniline composite of the invention is 0.6 wt % or less, preferably 0.1 wt % or less, more preferably 0.04 wt % or less, and further preferably 0.0001 wt % or less.

If the chlorine content of the polyaniline composite exceeds 0.6 wt %, a metal part which is in contact with the polyaniline composite may corrode.

The chlorine content as mentioned above can be measured by the combustion-ion-chromatography.

It is preferred that the polyaniline composite be able to be dissolved in an amount of 1 g or more in a solvent comprising 95 g of toluene and 5 g of isopropyl alcohol (IPA) at 25° C.

Here, the "be able to be dissolved" means that the polyaniline composite is uniformly dissolved in the solvent on the molecular basis: For example, it can be confirmed by the fact that the concentration gradient does not occur in the solution even if the polyaniline composite is dissolved in the solvent and centrifuged (1000 G, 30 minutes) by means of a centrifuge.

From the composition comprising the dissolved polyaniline composite, it is possible to obtain a uniform polyaniline composite film having no boundary when forming into a film.

The polyaniline composite may or may not further contain phosphor.

If the polyaniline composite comprises phosphor, the content of phosphor is 10 wt ppm or more and 5000 wt ppm or less. Further, the content of phosphor is 2000 wt ppm or less, 500 wt ppm or less and 250 wt ppm or less, for example.

The content of phosphor can be measured by the ICP atomic emission spectroscopy.

Further, it is preferred that the polyaniline composite do not contain an element belonging to the 12$^{th}$ group (zinc, for example) of the periodic table as impurities.

It is preferred that the conductivity of the shaped body of the polyaniline composite be 0.01 S/cm or more. The conductivity can be measured by the four-probe method.

The shaped body can be obtained by the following method, for example.

500 mg of a polyaniline composite is dissolved in a solvent comprising 9.5 g of toluene and 0.5 g of isopropyl alcohol to prepare a solution for measuring conductivity. On the upper surface of a glass substrate 1 on which an indium tin oxide (ITO) electrode 2 is formed (shown in FIG. 1), 1 ml of the solution for measuring the conductivity is applied by spin coating. The spin coating is conducted in the nitrogen atmosphere. In the spin coating method, the glass substrate rotation time after the dropwise addition of the solution for measuring the conductivity on the glass substrate is 15 seconds. In addition, the glass substrate rotation speed in the spin coating method is 2000 rpm. Thereafter, the glass substrate is dried to form a polyaniline composite thin film. Here, drying is conducted for 5 minutes under nitrogen atmosphere. Drying is conducted at 80° C.

Here, a shaped body means a polyaniline composite thin film itself formed on the glass substrate. The conductivity can be measured by the following method, for example.

Figure 2:
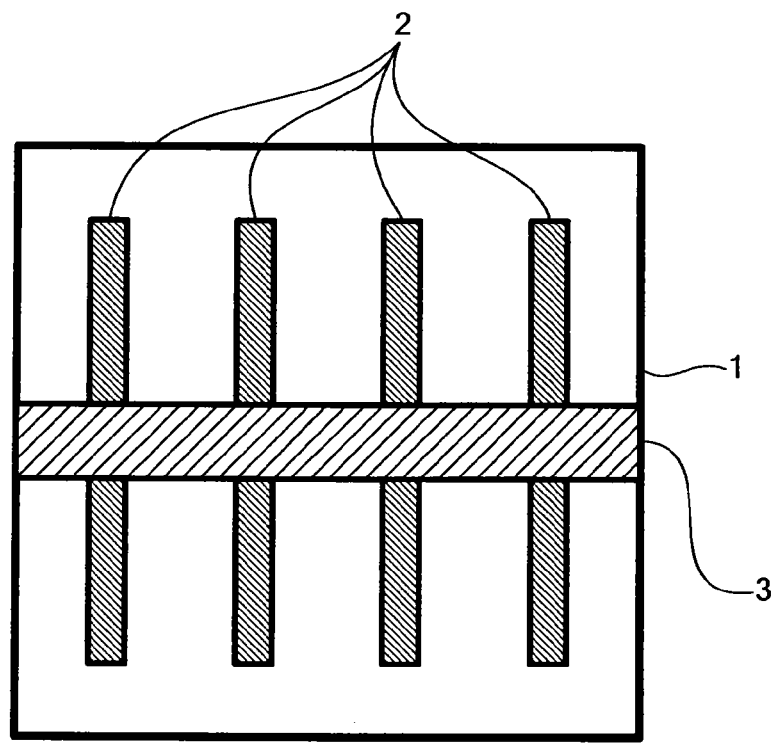
FIG. 2 is a view showing the upper surface of a glass substrate with the terminals of an ITO electrode being exposed on the surface by scraping a π-conjugated polymer thin film.

After drying the polyaniline composite thin film, as shown in FIG. 2, a part covering the terminals of the ITO electrode of the polyaniline composite thin film 3 is removed in the atmosphere of nitrogen, thereby to allow the terminals of the ITO electrode to be exposed on the surface. By using the terminals of the ITO electrode exposed on the surface, the conductivity is measured by the four-probe method by using a resistivity meter manufactured by Mitsubishi Chemical Analytech Co., Ltd.

[Method for Producing a Polyaniline Composite]

The polyaniline composite of the invention comprises a proton donar, phosphoric acid and an emulsifier which is different from the proton donar, and can be produced by subjecting a substituted or unsubstituted aniline to chemical oxidation polymerization in a solution having two liquid phases. Further, it can be produced by adding an oxidation polymerization agent to a solution having two liquid phases and comprising substituted or unsubstituted aniline, a proton donar, phosphoric acid and an emulsifier which is different from the proton donar.

By subjecting the substituted or unsubstituted aniline to chemical oxidation polymerization in the solution having two liquid phases comprising phosphoric acid and an emulsifier, the polyaniline molecules satisfying (1) above can be obtained. Here, it can be thought that the emulsifier serves to prevent phase inversion mentioned later. The inventors have found that, if a polyaniline composite is produced by subjecting substituted or unsubstituted aniline to chemical oxidative polymerization in a solution having two liquid phases comprising a proton donar and phosphoric acid, as compared with the case where hydrochloric acid is used instead of phosphoric acid, the amount of low-molecular weight components is increased. From the state of polymerization in which phosphoric acid is used, it can be thought that the above-mentioned two liquid phases are subjected to phase conversion during the polymerization. It is assumed that this phase conversion causes the amount of low-molecular weight components to be increased. The phenomenon called "phase conversion" is a phenomenon in which a liquid phase which was a continuous phase is changed to a dispersion phase and the other liquid phase which was a dispersion phase is changed to a continuous phase.

Here, "a solution having two liquid phases" means a solution state in which two liquid phases which are not compatible with each other are present in a solution. For example, it means a state in which the "high-polar solvent phase" and the "low-polar solvent phase" are present in a solution.

Further, a "solution having two liquid phases" includes a solution state in which one liquid phase is a continuous phase and the other liquid phase is a dispersion phase. For example, a state in which the "high-polar solvent phase" is a continuous phase and the "low-polar solvent phase" is a dispersion phase, and a state in which the "low-polar solvent phase" is a continuous phase and the "high-polar solvent phase" is a dispersion phase are included.

As the high-polar solvent used for producing the polyaniline composite of the invention, water is preferable. As the low-polar solvent, an aromatic hydrocarbon such as toluene and xylene is preferable.

The proton donar is preferably a compound represented by the following formula (I), more preferably a compound represented by the following formula (II), and further preferably a compound represented by the following formula (III).

M(XARn)m      (I)

(II)
$$M\left(\begin{array}{c} R^4 \\ | \\ X—C—COOR^8 \\ | \\ R^5—C—COOR^7 \\ | \\ R^6 \end{array}\right)_m$$

(III)
$$M\left(\begin{array}{c} H \\ | \\ O_3S—C—COOR^{14} \\ | \\ H_2C—COOR^{13} \end{array}\right)_{m'}$$

wherein M, X, A, R, $R^4$, $R^5$, $R^6$, $R^7$, $R^8$, $R^{13}$, $R^{14}$, n, m and m' are as explained in the proton donar of the polyaniline composite of the invention.

As for the emulsifier, both an ionic emulsifier of which the hydrophilic part is ionic and a non-ionic emulsifier of which the hydrophilic part is non-ionic can be used. Further, one or two or more emulsifiers may be used after mixing.

As the ionic emulsifier, a cationic emulsifier, an anionic emulsifier and a zwitterionic emulsifier can be given.

As specific examples of an anionic emulsifier (negative ion emulsifier), aliphatic acid, disproportionated rosin soap, a higher alcohol ester, polyoxyethylene alkyl ether phosphoric acid, alkenylsuccinic acid, sarconsinate and the salts thereof can be given.

Specific examples of a cationic emulsifier (positive ion emulsifier) include alkyldimethylbenzyl ammonium salts and alkyltrimethyl ammonium salts.

Specific examples of a zwitterion emulsifier (amphonic emulsifier) include an alkylbetaine type emulsifier, an alkylamidebetain emulsifier, an amino acid emulsifier and an amine oxide emulsifier.

Specific examples of a non-ionic emulsifier include a polyoxyethylene alkyl ether, polypropylene glycol polyethylene glycol ether, a polyoxyethylene glycerol borate aliphatic ester and a polyoxyethylene sorbitan aliphatic ester.

Of the above-mentioned emulsifiers, an anionic emulsifier and a non-ionic emulsifier are preferable.

As the anionic emulsifier, an anionic emulsifier having a phosphoric ester structure is further preferable. As the non-ionic emulsifier, a non-ionic emulsifier having a polyoxyethylene sorbitan aliphatic ester structure is further preferable.

The amount of the proton donar is preferably 0.1 to 0.5 mol, more preferably 0.3 to 0.45 mol, further preferably 0.35 to 0.4 mol relative to 1 mol of the aniline monomer.

If the amount of the proton donar is larger than the above-mentioned range, the "high-polar solvent phase" may not be separated from the "low-polar solvent phase" after the completion of the polymerization.

The concentration of phosphoric acid is 0.3 to 6 mol/L, more preferably 1 to 4 mol/L, and further preferably 1 to 2 mol/L, relative to the high-polar solvent.

The amount of the emulsifier is preferably 0.001 to 0.1 mol, more preferably 0.002 to 0.02 mol and further preferably 0.003 to 0.01 mol relative to 1 mol of the aniline monomer.

If the amount of the emulsifier is larger than the above-mentioned range, the "high-polar solvent phase" may not be separated from the "low-polar solvent phase" after the completion of the polymerization.

As the oxidant used in the chemical oxidation polymerization (hereinafter often referred to as the "chemical oxidative polymerization agent"), peroxides such as sodium persulfate, potassium persulfate, ammonium persulfate and hydrogen peroxide; and ammonium dichloromate, ammonium perchlorate, potassium iron (III) sulfate, iron (III) chloride, manganese dioxide, iodic acid, potassium permanganate, p-toluenesulfonic acid iron salt or the like can be used. A persulfate such as ammonium persulfate or the like is preferable.

These oxidants may be used singly or in combination of two or more.

The amount of the oxidant used is 0.05 to 1.8 mol, more preferably 0.8 to 1.6 mol and further preferably 1.2 to 1.4 mol, relative to 1 mol of the aniline monomer. By allowing the amount of the oxidant to be in this range, a sufficient polymerization degree can be obtained. In addition, since aniline is sufficiently polymerized, separation and collection are easy, and there is no fear that the solubility of the polymer is lowered.

The polymerization temperature is normally −5 to 60° C., preferably −5 to 40° C. The polymerization temperature may be changed during the polymerization reaction. Occurrence of side effects can be eliminated if this polymerization temperature is in this range.

The polyaniline composite of the invention can be produced specifically by the following method.

A solution obtained by dissolving the proton donar and the emulsifier in toluene is placed in a separable flask in a stream of an inert gas atmosphere such as nitrogen. Further, to this solution, substituted or unsubstituted aniline is added to this solution. Thereafter, phosphoric acid containing no chlorine is added to the solution and the solution is then cooled.

After lowering the inner temperature of the solution, the solution is then stirred. A solution obtained by dissolving ammonium persulfate in phosphoric acid is added dropwise by means of a dropping funnel, and the solution is allowed to react. Thereafter, the solution temperature is increased, the reaction is continued. After completion of the reaction, the solution is allowed to stand to cause the solution to be separated into two phases, and a water phase is collected. Toluene is added to an organic phase, and the resultant was washed with phosphoric acid and ion exchange water, whereby a toluene solution of a polyaniline composite (protonated polyaniline) can be obtained.

By removing a trace amount of insoluble matters contained in the resulting solution of the composite, a toluene solution of the polyaniline composite is collected. The solution is transferred to an evaporator, and then subjected to heating and pressure reduction to distill volatile matters off, whereby a polyaniline composite can be obtained.

[Composition]

The composition of the invention comprises the polyaniline composite of the invention and a solvent.

The solvent may be an organic solvent or an inorganic solvent such as water. The solvent may be used singly or in combination of two or more. An organic solvent is preferable.

The organic solvent may be a water-soluble organic solvent or an organic solvent which is substantially not miscible with water (water-immiscible organic solvent).

The water-soluble organic solvent may be either a protonic polar solvent or a non-protonic polar solvent. Examples thereof include alcohols such as isopropanol, 1-butanol, 2-butanol, 2-pentanol and benzyl alcohol; ketones such as acetone; ethers such as tetrahydrofuran and dioxane; and a non-protonic polar solvent such as N-methylpyrrolidone.

As the above-mentioned water-immiscible organic solvent, a hydrocarbon-based solvent such as benzene, toluene, xylene, ethyl benzene and tetralin; a halogen-containing solvent such as methylene chloride, chloroform, carbon tetrachloride, dichloroethane and tetrachloroethane; an ester-based solvent such as ethyl acetate, isobutyl acetate and n-butyl acetate; a ketone-based solvent such as methyl isobutyl ketone, methyl ethyl ketone, cyclopentanone and cyclohexanone; and an ether-based solvent such as cyclopentyl methyl ether. Of these, toluene, xylene, methyl isobutyl ketone (MIBK), chloroform, trichloroethane and ethyl acetate are preferable since they have excellent dissolution property of doped polyaniline.

The polyaniline composite of the invention can be dissolved in an alcohol such as isopropanol, 1-butanol, 2-butanol, 2-pentanol and benzyl alcohol as a solvent. An alcohol is preferable in respect of reduction of burden on the environment as compared with an aromatic compound such as toluene.

When an organic solvent is used as the solvent, by using a mixed organic solvent obtained by mixing a water-immiscible organic solvent and a water-soluble organic solvent in an amount ratio of 99 to 50:1 to 50 (mass ratio), generation of a gel during storage can be prevented, thus enabling a long-term storage.

As the water-immiscible organic solvent in the mixed organic solvent, a low-polar organic solvent can be used. As the low-polar organic solvent, toluene or chloroform is preferable. Further, as the water-soluble organic solvent of the mixed organic solvent, a high-polar organic solvent can be used. For example, methanol, ethanol, isopropyl alcohol, 2-methoxy ethanol, 2-ethoxy ethanol, acetone, methyl ethyl ketone, methyl isobutyl ketone, tetrahydrofuran or diethyl ether is preferable.

Although the amount ratio of the polyaniline composite of the invention depends on the type of the solvent, the amount is normally 900 g/kg or less, preferably 0.01 g/kg or more and 300 g/kg or less, more preferably 10 g/kg or more and 300 g/kg or less, with 30 g/kg or more and 300 g/kg or less being further preferable.

If the content of the polyaniline composite is too large, the solution state cannot be maintained, and as a result, handling in shaping a shaped body may be difficult, whereby uniformity of a shaped body may be deteriorated. Further, electric properties or mechanical strength or transparency of a shaped body may be lowered. On the other hand, if the content of the polyaniline composite is too small, when a film is formed by the method mentioned later, only a very thin film can be produced, making production of a uniform conductive film difficult.

The composition of the invention may further comprise a phenolic compound.

No restrictions are imposed on the phenolic compound as far as it comprises a phenolic hydroxyl group. The compound comprising a phenolic hydroxyl group is a compound having one phenolic hydroxyl group, a compound having a plurality of phenolic hydroxyl groups or a polymer compound formed of a repeating unit having one or a plurality of phenolic hydroxyl groups.

A compound having one phenolic hydroxyl group is preferably a compound represented by the following formulas (A), (B) and (C):

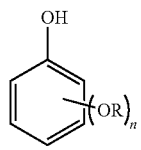

(A)

wherein n is an integer of 1 to 5, preferably 1 to 3, and more preferably 1.

R is an alkyl group having 1 to 20 carbon atoms, an alkenyl group, a cycloalkyl group, an aryl group, an alkylaryl group or an arylalkyl group.

In the phenolic compound represented by the formula (A), it is preferred that the substitution position of —OR be the meta- or the para-position relative to the phenolic hydroxyl group. By allowing the substitution position of —OR to be the meta- or the para-position, the steric hindrance of the phenolic hydroxyl group is reduced, whereby the conductivity of the composition can be further increased.

Specific examples of the phenolic compound represented by the formula (A) include methoxy phenol, ethoxy phenol, propoxy phenol, isopropoxy phenol, butyloxy phenol, isobutyloxy phenol and tert-butyloxy phenol.

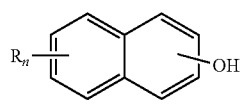

(B)

wherein n is an integer of 0 to 7, preferably 0 to 3, and more preferably 1.

R is independently an alkyl group having 1 to 20 carbon atoms, an alkenyl group, an alkylthio group, a cycloalkyl group having 3 to 10 carbon atoms, an aryl group having 6 to 20 carbon atoms, an alkylaryl group or an arylalkyl group.

Specific examples of the phenolic compound represented by the formula (B) include hydroxylnaphthalene.

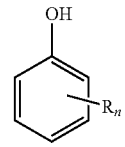

(C)

wherein n is an integer of 1 to 5, preferably 1 to 3, and more preferably 1.

R is independently an alkyl group having 1 to 20 carbon atoms, an alkenyl group, an alkylthio group, a cycloalkyl group having 3 to 10 carbon atoms, an aryl group having 6 to 20 carbon atoms, an alkylaryl group or an arylalkyl group.

Specific examples of the compound represented by the formula (C) include o-, m- or p-cresol, o-, m- or p-ethylphenol, o-, m- or p-propylphenol, and o-, m- or p-butylphenol can be given.

As for R in the formulas (A), (B) and (C), as the alkyl group having 1 to 20 carbon atoms, methyl, ethyl, propyl, isopropyl, butyl, isobutyl, tert-butyl or the like can be given.

As the alkenyl group, a group having an unsaturated bond in the molecule of the above-mentioned alkyl group can be given.

As the cycloalkyl group, cyclopentyl, cyclohexyl or the like can be given.

As the aryl group, phenyl, naphthyl or the like can be given.

As the alkylaryl group and the arylalkyl group, a group obtained by combining the alkyl group and the aryl group mentioned above can be given.

Examples of the compound having one phenolic hydroxyl group are given above. As specific examples of the substituted phenol include phenol, o-, m- or p-chlorophenol, salicylic acid and hydroxylbenzoic acid can be given. As specific examples of the compound having a plurality of phenolic hydroxyl groups include catechol, resorcinol, and a compound represented by the following formula (D) can be given.

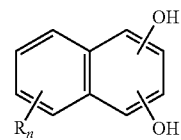

(D)

wherein R is a hydrocarbon group, a hetero atom-containing hydrocarbon group, a halogen atom, a carboxylic acid group, an amino group, an SH group, a sulfonic acid group or a hydroxyl group; a plurality of Rs may be the same or different; and n is an integer of 0 to 6.

It is preferred that the phenolic compound represented by the formula (D) have two or more hydroxyl groups which are not adjacent with each other.

As specific examples of the phenolic compound represented by the formula (D), 1,6-naphthalene diol, 2,6-naphthalene diol and 2,7-naphthalene diol can be given.

As specific examples of the polymer compound composed of a repeating unit having one or a plurality of phenolic hydroxyl groups, a phenol resin, polyphenol and poly(hydroxystyrene) can be given.

As for the content of the phenolic compound in the composition, the molar concentration of the phenolic compound per 1 g of the polyaniline composite is preferably 0.01 [mmol/g] or more and 100 [mol/g] or less, more preferably 0.05 [mmol/g] or more and 1 [mol/g] or less, further preferably 0.1 [mmol/g] or more and 500 [mmol/g] or less, and particularly preferably 0.2 [mmol/g] or more and 80 [mmol/g] or less.

If the content of the phenolic compound is too small, effects of improving the conductivity may not be obtained. If the content of the phenolic compound is too large, the film quality may be deteriorated. Further, a large amount of heat or considerable labor such as time is required when removing the phenolic compound by evaporation, leading to an increase in cost.

The composition of the invention may contain a heat-resistant stabilizer. The heat-resistant stabilizer is an acidic material or a salt of an acidic material, and the acidic material may be either an organic acid (an acid of an organic compound) or an inorganic acid (an acid of an inorganic compound).

Further, the composition of the invention may contain a plurality of heat-resistant stabilizers.

If the composition of the invention contains only an acidic material as the heat-resistant stabilizer, the acidic material is preferably a compound which is different from the proton donar of the polyaniline composite. If the composition of the invention contains only a salt of an acidic material, it is preferred that the salt of the acidic material is a compound different from the proton donar of the polyaniline composite. If the composition of the invention contains both an acidic material or a salt of an acidic material as the heat-resistant stabilizer, it is preferred that at least one of the acidic material and the salt of the acidic material be a compound different from the proton donar.

If the composition of the invention contains the phenolic compound and further contains only an acidic material, it is preferred that the acidic material be different from the phenolic compound. If the composition of the invention contains the phenolic compound and further contains only a salt of an acidic material, it is preferred that the salt of the acidic material be different from the phenolic compound. If the composition of the invention contains the phenolic compound and contains both an acidic material and a salt of an acidic material, it is preferred that at least one of the acidic material and the salt of the acidic material be different from the phenolic compound.

The acidic material as the heat-resistant stabilizer is preferably an organic acid, more preferably an organic acid containing one or more of a sulfonic acid group, a carboxy group, a phosphoric acid group or a phosphonic acid. An organic acid containing one or more sulfonic acid groups is further preferable.

The above-mentioned organic acid having one or more sulfonic acid groups is preferably a cyclic, chain-like or branched alkylsulfonic acid, a substituted or unsubstituted aromatic sulfonic acid or polysulfonic acid, which has one or more sulfonic acid groups.

As the alkylsulfonic acid, methanesulfonic acid, ethanesulfonic acid and di-2-ethylhexylsulfosuccinic acid can be given. The alkyl group is preferably a straight-chain or branched alkyl group having 1 to 18 carbon atoms.

As the aromatic sulfonic acid, sulfonic acid having a benzene ring, sulfonic acid having a naphthalene skeleton, sulfonic acid having an anthracene skeleton, substituted or unsubstituted benzenesulfonic acid, substituted or unsubstituted naphthalene sulfonic acid and substituted or unsubstituted anthracene sulfonic acid can be given. Of these, naphthalene sulfonic acid is preferable. Specific examples of naphthalene sulfonic acid include naphthalene sulfonic acid, dodecylbenzenesulfonic acid and anthraquinonesulfonic acid can be given.

Here, the substituent is a substituent selected from an alkyl group, an alkoxy group, a hydroxyl group, a nitro group, a carboxy group and an acyl group. One or more may be substituted.

The above-mentioned polysulfonic acid is a sulfonic acid in which the main chain or the side chain of a polymer chain is substituted by a plurality of sulfonic acid groups. Polystyrene sulfonic acid can be given, for example.

The organic acid having one or more carboxy groups is preferably a cyclic, chain-like or branched alkylcarboxylic acid, a substituted or unsubstituted aromatic carboxylic acid or polycarboxylic acid.

As the above-mentioned alkylcarboxylic acid, undecylenic acid, cyclohexanecarboxylic acid and 2-ethylhexanoic acid can be given. Here, the alkyl group is preferably a straight-chain or branched alkyl group having 1 to 18 carbon atom.

As the above-mentioned substituted or unsubstituted aromatic carboxylic acid, a substituted or unsubstituted benzene carboxylic acid and naphthalene carboxylic acid can be given. Here, the substituent is a substituent selected from a sulfonic acid group, an alkyl group, an alkoxy group, a hydroxyl group, a nitro group and an acyl group. One or more may be substituted. Specific examples include salicylic acid, benzoic acid, naphthoic acid and trimesic acid.

The above-mentioned organic acid having one or more phosphoric acid groups or phosphonic acid groups is preferably a cyclic, chain-like or branched alkylphosphoric acid or alkylphosphonic acid having one or more phosphoric acid groups or phosphonic acid groups; a substituted or unsubstituted aromatic phosphoric acid or an aromatic phosphonic acid; polyphosphoric acid or polyphosphonic acid.

As the above-mentioned alkylphosphoric acid or alkylphosphonic acid, dodecylphosphoric acid and phosphoric acid di(2-ethylhexyl)ester can be given. Here, the alkyl group is preferably a straight-chain or branched alkyl group having 1 to 18 carbon atoms.

As examples of the aromatic phosphoric acid and the aromatic phosphonic acid, substituted or unsubstituted benzenesulfonic acid or phosphonic acid, naphthalene sulfonic acid or phosphonic acid or the like can be given. Here, the substituent is a substituent selected from an alkyl group, an alkoxy group, a hydroxyl group, a nitro group, a carboxy group and an acyl group. One or more may be substituted. For example, phenylphosphonic acid can be given.

As the salt of the acidic material contained in the composition of the invention, a salt of the above-mentioned acidic material can be given.

The composition of the invention may contain two or more of an acidic material and/or a salt of an acid material as the heat-resistant stabilizer. Specifically, the composition of the invention may contain a plurality of different acidic materials and/or a plurality of different salts of acidic materials.

When the proton donar in the polyaniline composite is sulfonic acid and the composition contains only an acidic material as the heat-resistant stabilizer, it is preferred that the acidic material be sulfonic acid which is identical with or different from the proton donar. Further, if the composition contains only a salt of an acidic material as the heat-resistant stabilizer, it is preferred that the salt of the acidic material be a salt of sulfonic acid which is identical with or different from the proton donar of the polyaniline composite.

When the composition contains an acidic material or a salt of the acidic material as the heat-resistant stabilizer, it is preferred that at least one of the acidic materials and the salt of the acidic material be sulfonic acid or a salt of sulfonic acid which is identical with or different from the proton donar.

When the composition of the invention contains only sulfonic acid as the heat-resistant stabilizer, it is preferred that the composition satisfy the formula (12). If the composition contains only a salt of sulfonic acid as the heat-resistant stabilizer, it is preferred that the composition satisfy the formula (13). When the composition contains sulfonic acid and a salt of sulfonic acid as the heat-resistant stabilizer, it is preferred that the composition satisfy the following formula (14):

$$0.01 \leq S_2/N_2 \leq 0.5 \quad (12)$$

$$0.01 \leq S_3/N_3 \leq 0.5 \quad (13)$$

$$0.01 \leq S_4/N_4 \leq 0.5 \quad (14)$$

Here, $S_2$ is the sum of the number of moles of sulfur atoms of all of the acidic materials contained in the composition; $N_2$ is the sum of the number of moles of nitrogen atoms of all of the polyaniline composites contained in the composition; $S_3$ is the sum of the number of moles of sulfur atoms of all of the acidic materials contained in the composition; $N_3$ is the sum of the number of moles of nitrogen atoms of all of the polyaniline composites contained in the composition; $S_4$ is the sum of the number of moles of sulfur atoms of all of the acidic materials and the salts of the acidic materials contained in the composition; and $N_4$ is the sum of the number of moles of nitrogen atoms of all of the polyaniline composites contained in the composition.

If the composition of the invention satisfies any of the formulas (12), (13) and (14), it is preferred that the composition of the invention further satisfy the following formula (II):

$$0.36 \leq S_1/N_1 \leq 1.15 \quad (11)$$

wherein $S_1$ is the number of moles of sulfur atoms contained in the composition and $N_1$ is the number of moles of nitrogen atoms contained in the composition.

When the composite of the invention contains only an acid material, it is preferable that the acidity (pKa) of the acid material be 5.0 or less. In addition, although the lower limit of the acidity is not particularly restricted, in the case where the acidity of the acidic material is −4.0 or less, for example, there is a possibility that a polyaniline composite may deteriorate.

When the composition of the invention contains only a salt of an acid material, it is preferable that the acidity of the salt of the acidic material be 5.0 or less. The lower limit of the acidity is the same as that of above-mentioned acid material.

When the composite of the invention contains both an acid material and a salt of an acid material, it is preferable that at least one of the following be satisfied: the acidic material has an acidity of 5.0 or less and the salt of the acidic material has an acidity of 5.0 or less. The lower limit of the acidity is the same as that mentioned above.

The acidity (pKa) is defined by a calculation chemistry method. That is, the charge density on the surface of a molecule is calculated by the quantum chemical calculation developed by A. Klamt and others, and then a method stated in the volume 99, p. 2224 (1995) of Journal of Physical Chemistry is used in which the interaction between different species molecules is calculated as an activity coefficient.

Specifically, by using "TURBOMOLE Version 6.1" (manufactured by COSMO logic), the structure is optimized using TZVP as a basis function, and COSMO-RS calculation is conducted by "COSMO therm Version C2.1 Release 01.10" (manufactured by COSMO logic).

Here, pKa is computable by inputting into "COSMO therm Version C2.1 Release 01.10" conditions of a 25° C. water solvent, the chemical formula of a molecule, and the chemical formula of the molecule from which proton has been removed.

In the composition of the invention, the content of a heat-resistant stabilizer is 1 to 1000 parts by mass, more preferably 10 to 100 parts by mass, relative to 100 parts by mass of the polyaniline composite.

The composition of the invention may comprise 90 wt % or more, 95 wt % or more, 99 wt % or more, and 100 wt % or more of the polyaniline composite, a solvent, a phenolic compound and a stabilizer, and also may contain additives such as other resins, inorganic materials, a hardening agent, a plasticizer, and an organic conductive material, for example.

Other resin is added as a binder base material, a plasticizer, and a matrix base material, for example.

As specific examples of other resins, polyolefin such as polyethylene and polypropylene, chlorinated polyolefin, polystyrene, polyester, polyamide, polyacetal, polyethylene terephthalate, polycarbonate, polyethylene glycol, polyethylene oxide, polyacrylic acid, polyacrylic ester, polymethacrylic acid ester, and polyvinyl alcohol can be given.

Instead of or together with the above-mentioned resins, a thermosetting resin such as an epoxy resin, a urethane resin, and a phenol resin, or a precursor capable of forming these thermosetting resins may also be included.

An inorganic material is added, for example, in order to improve mechanical properties such as strength, surface hardness and dimensional stability or electrical properties such as conductivity.

As specific examples of the inorganic material, silica (silicon dioxide) and titania (titanium dioxide), alumina (aluminum oxide), Sn-containing $In_2O_3$ (ITO), Zn-containing $In_2O_3$, a co-substituted compound of $In_2O_3$ (an oxide in which the trivalent In is replaced by the tetravalent element and the divalent element), Sb-containing $SnO_2$ (ATO), ZnO, Al-containing ZnO (AZO), a Ga-containing ZnO (GZO), or the like can be given.

A hardening agent is added in order to improve strength, surface hardness, dimensional stability, and other mechanical physical properties, for example. As specific examples of the hardening agent, a thermo-hardening agent such as a phenol resin, an optical hardening agent formed of an acrylate-based monomer and a photo polymerization initiator can be given.

A plasticizer is added in order to improve the mechanical properties such as tensile strength, bending strength or the like.

Specific examples of the plasticizer include phthalic esters or phosphoric esters. As the organic conductive material, a carbon material such as carbon black and carbon nanotube, or a conductive polymer other than the polyaniline obtained by the invention or the like can be given.

The method for producing the composition of the invention containing the above-mentioned ingredients is not limited, and the composition can be prepared by a known method. The composition of the invention can be prepared by a method disclosed in WO05/052058.

[Shaped Body]

A shaped body, a conductive stacked body (surface conductive articles), a conductive article and a conductive film can be obtained from the polyaniline composite and/or the composition of the invention.

For example, by drying the composition of the invention to remove the solvent, a shaped body can be obtained. The shaped body may be in any form such as a plate, a bar or the like. For example, by applying the composition of the invention to a base having a desired shape such as a film of glass or a resin, a sheet or a non-woven fabric and by removing the solvent, a conductive stacked body having a conductive film can be produced. By processing the conductive stacked body into a desired shape by a known method such as vacuum shaping or pressure shaping, a conductive article can be produced. In respect of shaping, it is preferred that the base be a resin film or a sheet or an unwoven fabric.

The thickness of the conductive film is normally 1 mm or less, preferably 10 nm or more and 50 μm or less. A film with this thickness range has advantages that it hardly suffers from occurrence of cracks at the time of film formation and has uniform electric properties.

As the method of applying a composition to a base, known methods such as the cast method, the spray method, the dip coating method, the doctor blade method, the bar coating method, the spin coating method, the electro-spinning method, the screen-printing method, and the gravure printing method can be used.

When drying the above-mentioned coating film, the coating film may be heated according to the type of a solvent. For example, heating is conducted under the stream of air at 250° C. or less, preferably 50° C. or more and 200° C. or less. Further, according to need, heating is conducted under reduced pressure. No specific restrictions are imposed on the heating temperature and the heating time, and they can be appropriately selected according to the material used.

The composition of the invention can be a self-support shaped body having no base.

When allowing the composition of the invention to be a self-support shaped body, it is preferred that the composition include the above-mentioned other resins, whereby a shaped body having a desired mechanical strength can be obtained.

It is preferable that the conductivity of the shaped body of the composition of the invention be 0.01 s/cm or more.

Here, the shaped body can be obtained as follows. On the upper surface of a glass substrate 1 on which an ITO electrode 2 is formed by patterning, as shown in FIG. 1, 1 ml of the composition is applied. Specifically, application is conducted by the spin coating method. Here, the application by the spin coating method is conducted in the atmosphere of nitrogen. In the spin coating method, the glass substrate rotation time after the composition is added dropwise to the glass substrate is 15 seconds. In the spin coating method, the glass substrate rotation speed is 2000 rpm. Thereafter, the glass substrate is dried to form a thin film of the composition. The drying is conducted in the atmosphere of nitrogen. The drying time is 5 minutes. Further, the drying temperature is 80° C.

Figure 3:
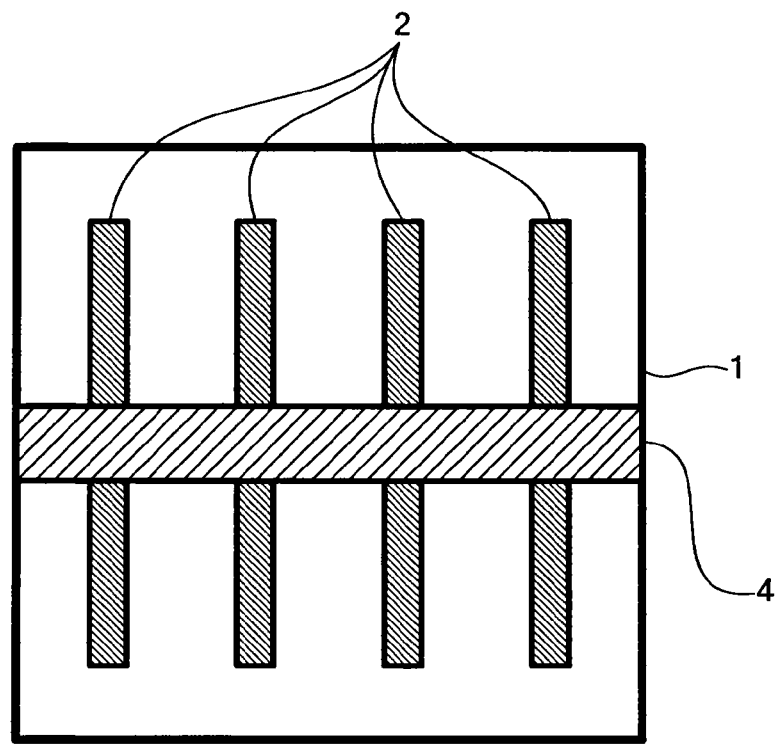
FIG. 3 is a view showing the upper surface of a glass substrate with the terminals of an ITO electrode being exposed on the surface by scraping a conductive composition thin film.

The shaped body as referred to herein means a shaped body itself of the composition formed on the glass substrate. The conductivity can be obtained by the following method, for example. After drying the composition thin film, as shown in FIG. 3, a part of the composition thin film 4 covering the terminals of an ITO electrode is scraped off in the atmosphere of nitrogen, whereby the terminals of an ITO electrode is exposed on the surface. By using the terminals of the ITO electrode exposed on the surface, the conductivity is measured by the four-probe method by using a resistivity meter produced by Mitsubishi Chemical Analytech Co., Ltd.

[Capacitor]

From the polyaniline composite and/or the composition of the invention, a capacitor can be obtained.

As the capacitor, an electrolytic capacitor and an electric double-layer capacitor can be given. An electrolytic capacitor includes a solid electrolytic capacitor.

From the polyaniline composite and/or the composition of the invention, an undercoating agent for plating or an anti-rust can be obtained.

EXAMPLES

Example 1

Production of a Polyaniline Composite

A solution obtained by dissolving 37.8 g of Aerosol OT (diisooctyl sodium sulfosuccinate) and 1.47 g of Sorbon T-20 (manufactured by Toho Chemical Industry Co., Ltd.), which is a non-ionic emulsifier having a polyoxyethylene sorbitan fatty acid ester structure, in 600 mL of toluene was put into a separable flask of 6 L placed in the stream of nitrogen. Then, 22.2 g of aniline was added to this solution. Thereafter, 1800 mL of 1M phosphoric acid was added to this solution, and the temperature of the solution having two liquid phases, i.e. toluene and water, was cooled to 5° C.

When the internal temperature of the solution reached 5° C., stirring was conducted at 390 rpm. Then, a solution obtained by dissolving 65.7 g of ammonium persulfate in 600 mL of 1M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 1 hour. Then, the reaction solution was allowed to stand and the solution was separated into two phases, and an aqueous phase was collected. 1500 mL of toluene was added to an organic phase, and the resulting mixture was washed once with 600 mL of 1M phosphoric acid and three times with 600 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator, and heated in a hot water bath of 60° C. By reducing the pressure, volatile matters were distilled off by evaporation, whereby 43.0 g of a polyaniline composite was obtained.

The chlorine content of the thus prepared polyaniline composite was measured by the organochlorine content-coulometric titration method. It was confirmed that the chlorine content was less than 5 wt ppm.

0.25 g of the resulting polyaniline composite was dissolved in 4.75 g of toluene and 0.25 g of isopropy alcohol. To the resulting solution, 10 mL of a 1M aqueous sodium hydroxide solution was added, and the mixture solution was stirred for 15 minutes. Thereafter, the total amount was subjected to suction filtration by means of No. 4 filter paper, and the residues were washed three times with 10 mL of toluene, three times with 10 mL of ion exchange water and three times with 10 mL of methanol. By subjecting the resulting solid matters to drying under reduced pressure, polyaniline for measuring the molecular weight was obtained.

To 2 mg of polyaniline for measuring the molecular weight, 10 mL of 0.01M LiBr-containing NMP was added, and dissolved by means of a shaker. Then, the solution was filtered by means of a chromatodisc (aqueous-base/non-aqueous base, 0.45μ) manufactured by GL Science Inc, and the molecular weight distribution was measured by means of GPC (gel permeation chromatography).

The measurement by means of GPC (gel permeation chromatography) was conducted by means of GPC columns manufactured by Showa Denko (Shodex KF-806×2, Shodex KF-803×1). The measurement conditions are as follows:
Solvent: 0.01M LiBr-containing NMP
Flow rate: 0.40 ml/min
Column temperature: 60° C.
Injection amount: 100 µL
UV detection wavelength: 270 nm
The molecular weight distribution was measured in terms of polystyrene As a result, $P_{10000}/P_{ALL}$ was found to be 0.096. The results are shown in Table 1.

Example 2

6.3 g of Aerosol OT (diisooctyl sodium sulfosuccinate) and 0.25 g of Sorbon T-20 (manufactured by Toho Chemical Industry Co., Ltd.) were dissolved in 100 mL of toluene, and the resulting solution was put into a separable flask of 1 L placed in the stream of nitrogen. Then, 3.7 g of aniline was added to this solution. Thereafter, 300 mL of 3M phosphoric acid was added to this solution, and the temperature of the solution having two liquid phases, i.e. toluene and water, was cooled to 5° C.

When the internal temperature of the solution reached 5° C., stirring was conducted at 300 rpm. Then, a solution obtained by dissolving 11.0 g of ammonium persulfate in 100 mL of 3M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 1 hour. Then, the reaction solution was allowed to stand and the solution was separated into two phase, and an aqueous phase was collected. 250 mL of toluene was added to an organic phase, and the resulting mixture was washed once with 100 mL of 1M phosphoric acid and three times with 100 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator and heated in a hot water bath of 60° C. By reducing the pressure, volatile matters were distilled off by evaporation, whereby 7.2 g of a polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.051. The results are shown in Table 1.

Example 3

10.5 g of Aerosol OT (diisooctyl sodium sulfosuccinate) and 0.41 g of Sorbon 1-20 (manufactured by Toho Chemical Industry Co., Ltd.) were dissolved in 170 mL of toluene, and the resulting solution was put into a separable flask of 1 L placed in the stream of nitrogen. Then, 6.2 g of aniline was added to this solution. Thereafter, 280 mL of 3M phosphoric acid was added to this solution, and the temperature of the solution having two liquid phases, i.e. toluene and water, was cooled to 5° C.

When the internal temperature of the solution reached 5° C., stirring was conducted at 300 rpm. Then, a solution obtained by dissolving 18.3 g of ammonium persulfate in 60 mL of 3M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 1 hour. Then, the reaction solution was allowed to stand and the solution was separated into two phase, and an aqueous phase was collected. 250 mL of toluene was added to an organic phase, and the resulting mixture was washed once with 100 mL of 1M phosphoric acid and three times with 100 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator, heated in a hot water bath of 60° C. By reducing the pressure, volatile matters were distilled off by evaporation, whereby 14.8 g of a polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.074. The results are shown in Table 1.

Example 4

113.4 g of Aerosol OT (diisooctyl sodium sulfosuccinate) and 4.41 g of Sorbon T-20 (manufactured by Toho Chemical Industry Co., Ltd.) were dissolved in 1800 mL of toluene, and the resulting solution was put into a separable flask of 6 L placed in the stream of nitrogen. Then, 66.6 g of aniline was added to this solution. Thereafter, 1800 mL of 1M phosphoric acid was added to this solution, and the temperature of the solution having two liquid phases, i.e. toluene and water, was cooled to 5° C.

When the internal temperature of the solution reached 5° C., stirring was conducted at 390 rpm. Then, a solution obtained by dissolving 197.1 g of ammonium persulfate in 900 mL of 1M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 1 hour. Then, the reaction solution was allowed to stand and the solution was separated into two phase, and an aqueous phase was collected. 2250 mL of toluene was added to an organic phase, and the resulting mixture was washed once with 900 mL of 1M phosphoric acid and three times with 900 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator and heated in a hot water bath of 60° C. By reducing the pressure, volatile matters were distilled off by evaporation, whereby 164.2 g of a polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.095. The results are shown in Table 1.

Example 5

56.74 g of Aerosol OT (diisooctyl sodium sulfosuccinate) and 2.22 g of Sorbon T-20 (manufactured by Toho Chemical Industry Co., Ltd.), which is a non-ionic emulsifier having a polyoxyethylene sorbitan fatty acid ester structure, were dissolved in 600 mL of toluene, and the resulting solution was put into a separable flask of 6 L placed in the stream of nitrogen. Then, 33.3 g of aniline was mixed with 300 mL of toluene, and the resulting mixture was added to this solution. Thereafter, 2700 mL of 1M phosphoric acid was added to this solution, and the temperature of the solution having two liquid phases, i.e. toluene and water, was cooled to 5° C. When the internal temperature of the solution reached 5° C., stirring was conducted at 390 rpm. Then, a solution obtained by dissolving 98.55 g of ammonium persulfate in 900 mL of 1M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 10 minutes. Then, the reaction solution was allowed to stand and the solution was separated into two phases, and an aqueous phase was collected. 2250 mL of toluene was added to an organic phase, and the resulting mixture was washed once with 900 mL of 1M phosphoric acid and three times with 900 mL of ion exchange water, whereby a toluene solution of a polyaniline composite (protonated polyaniline) was obtained.

A slight amount of impurities contained in the resulting composite solution was removed by means of filter paper of #2, whereby a toluene solution of the polyaniline composite was collected. The solution was then transferred to an evaporator and heated in a hot water bath of 60° C. By reducing the pressure, volatile matters were distilled off by evaporation, whereby 64.5 g of polyaniline composite was obtained.

The chlorine content of the thus prepared polyaniline composite was measured by the organochlorine content-coulometric titration method. It was confirmed that the chlorine content was less than 5 wt ppm. Further, the weight-average molecular weight and the molecular weight distribution of the resulting polyaniline composite were measured in the same manner as in Example 1, and $P_{10000}/P_{ALL}$ was found to be 0.1382. The results are shown in Table 1.

Example 6

56.8 g of Aerosol OT (diisooctyl sodium sulfosuccinate) and 2.21 g of Sorbon T-20 (manufactured by Toho Chemical Industry Co., Ltd.), which is a non-ionic emulsifier having a polyoxyethylene sorbitan fatty acid ester structure, were dissolved in 600 mL of toluene, and the resulting solution was put into a separable flask of 6 L placed in the stream of nitrogen. Then, 33.4 g of aniline was mixed with 300 mL of toluene, and the resulting mixture was added to this solution. Thereafter, 2700 mL of 1M phosphoric acid was added to this solution, and the temperature of the solution having two liquid phases, i.e. toluene and water, was cooled to 5° C. When the internal temperature of the solution reached 5° C., stirring was conducted at 260 rpm. Then, a solution obtained by dissolving 98.57 g of ammonium persulfate in 900 mL of 1M phosphoric acid was added dropwise over 2 hours by means of a dropping funnel. For 18 hours after the start of the dropwise addition, the reaction was conducted while keeping the internal temperature of the solution at 5° C. Then, the reaction temperature was elevated to 40° C., and the reaction was continued for 10 minutes. Then, the reaction solution was allowed to stand and the solution was separated into two phases, and an aqueous phase was collected. 2250 mL of toluene was added to an organic phase, and the resulting mixture was washed once with 900 mL of 1M phosphoric acid and three times with 900 mL of ion exchange water, whereby a toluene solution of a polyaniline composite (protonated polyaniline) was obtained.

A slight amount of impurities contained in the resulting composite solution was removed by means of filter paper of #2, whereby a toluene solution of the polyaniline composite was collected. The solution was then transferred to an evaporator and heated in a hot water bath of 60° C. By reducing the pressure, volatile matters were distilled off by evaporation, whereby 64.6 g of a polyaniline composite was obtained.

The chorine content of the thus prepared polyaniline composite was measured by the organochlorine content-coulometric titration method. It was confirmed that the chlorine content was less than 5 wt ppm.

Further, the weight-average molecular weight and the molecular weight distribution of the resulting polyaniline composite were measured in the same manner as in Example 1, and $P_{10000}/P_{ALL}$ was found to be 0.1357. The results are shown in Table 1.

Comparative Example 1

3.6 g of Aerosol OT (diisooctyl sodium sulfosuccinate) was dissolved in 100 mL of toluene, and the resulting solution was put into a separable flask of 1 L placed in the stream of nitrogen. Then, 3.7 g of aniline was added to this solution. Thereafter, 300 mL of 1M phosphoric acid was added to this solution, and the temperature of the solution having two liquid phases, i.e. toluene and water, was cooled to 5° C.

When the internal temperature of the solution reached 5° C., stirring was conducted at 300 rpm. Then, a solution obtained by dissolving 7.3 g of ammonium persulfate in 100 mL of 1M phosphoric acid was added dropwise over 2 hours by means of a dropping funnel. For 18 hours after the start of the dropwise addition, the reaction was conducted while keeping the internal temperature of the solution at 5° C. Thereafter, 250 mL of toluene was added, the reaction temperature was elevated to 25° C., and the reaction was continued for 4 hours. Then, the reaction solution was allowed to stand and the solution was separated into two phases, and an aqueous phase was collected. A toluene phase was washed twice with 100 mL of ion exchange water, once with 100 mL of 1M phosphoric acid and further three times with 100 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator and heated in a hot water bath of 60° C. By reducing the pressure, volatile matters were distilled off by evaporation, whereby 4.1 g of polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.169. The results are shown in Table 1.

Comparative Example 2

3.6 g of Aerosol OT (diisooctyl sodium sulfosuccinate) was dissolved in 50 mL of toluene, and the resulting solution was put into a separable flask of 1 L placed in the stream of nitrogen. Then, 3.7 g of aniline was added to this solution. Thereafter, 300 mL of 1M phosphoric acid was added to this solution, and the temperature of the solution having two liquid phases, i.e. toluene and water, was cooled to 5° C.

When the internal temperature of the solution reached 5° C., stirring was conducted at 300 rpm. Then, a solution obtained by dissolving 7.3 g of ammonium persulfate in 100 mL of 1M phosphoric acid was added dropwise over 2 hours by means of a dropping funnel. For 18 hours after the start of the dropwise addition, the reaction was conducted while keeping the internal temperature of the solution at 5° C. Thereafter, 250 mL of toluene was added, the reaction temperature was elevated to 25° C., and the reaction was continued for 4 hours. Then, the reaction solution was allowed to stand and the solution was separated into two phases, and an aqueous phase was collected. A toluene phase was washed twice with 100 mL of ion exchange water, once with 100 mL of 1M phosphoric acid and further three times with 100 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator and heated in a hot water bath of 60° C. By reducing the pressure, volatile matters were distilled off by evaporation, whereby 3.6 g of polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.234. The results are shown in Table 1.

Comparative Example 3

3.6 g of Aerosol OT (diisooctyl sodium sulfosuccinate) was dissolved in 150 mL of toluene, and the resulting solution was put into a separable flask of 1 L placed in the stream of nitrogen. Then, 3.7 g of aniline was added to this solution. Thereafter, 300 mL of 1M phosphoric acid was added to this solution, and the temperature of the solution having two liquid phases, i.e. toluene and water, was cooled to 5° C.

When the internal temperature of the solution reached 5° C., stirring was conducted at 300 rpm. Then, a solution obtained by dissolving 7.3 g of ammonium persulfate in 100 mL of 1M phosphoric acid was added dropwise over 2 hours by means of a dropping funnel. For 18 hours after the start of the dropwise addition, the reaction was conducted while keeping the internal temperature of the solution at 5° C. Thereafter, 250 mL of toluene was added, the reaction temperature was elevated to 25° C., and the reaction was continued for 4 hours. Then, the reaction solution was allowed to stand and the solution was separated into two phases, and an aqueous phase was collected. A toluene phase was washed twice with 100 mL of ion exchange water, once with 100 mL of 1M phosphoric acid and further three times with 100 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator and heated in a hot water bath of 60° C. By reducing the pressure, volatile matters were distilled off by evaporation, whereby 3.4 g of polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.251. The results are shown in Table 1.

Comparative Example 4

21.6 g of Aerosol OT (diisooctyl sodium sulfosuccinate) was dissolved in 600 mL of toluene, and the resulting solution was put into a separable flask of 1 L placed in the stream of nitrogen. Then, 22.2 g of aniline was added to this solution. Thereafter, 1800 mL of 1M phosphoric acid was added to this solution, and the temperature of the solution having two liquid phases, i.e. toluene and water, was cooled to 5° C.

When the internal temperature of the solution reached 5° C., stirring was conducted at 390 rpm. Then, a solution obtained by dissolving 43.8 g of ammonium persulfate in 600 mL of 1M phosphoric acid was added dropwise over 2 hours by means of a dropping funnel. For 18 hours after the start of the dropwise addition, the reaction was conducted while keeping the internal temperature of the solution at 5° C. Thereafter, 1500 mL of toluene was added, the reaction temperature was elevated to 25° C., and the reaction was continued for 4 hours. Then, the reaction solution was allowed to stand and the solution was separated into two phase, and an aqueous phase was collected. A toluene phase was washed twice with 600 mL of ion exchange water, once with 600 mL of 1M phosphoric acid and further three times with 600 mL of ion exchange water, whereby a toluene solution of a polyaniline composite (protonated polyaniline) was obtained.

A slight amount of impurities contained in the resulting composite solution was removed by means of filter paper of #5C, whereby a toluene solution of the polyaniline composite was collected. The solution was then transferred to an evaporator and heated in a hot water bath of 60° C. By reducing the pressure, volatile matters were distilled off by evaporation, whereby 21.9 g of a polyaniline composite was obtained.

The chlorine content of the thus prepared polyaniline composite was measured by the organochlorine content-coulometric titration method. It was confirmed that the chlorine content was less than 5 wt ppm. Further, the molecular weight distribution of the resulting polyaniline composite was measured in the same manner as in Example 1, and $P_{10000}/P_{ALL}$ was found to be 0.249. The results are shown in Table 1.

Comparative Example 5

A solution obtained by dissolving 4.3 g of Aerosol OT (diisooctyl sodium sulfosuccinate) in 100 mL of toluene was put into a separable flask of 1 L placed in the stream of nitrogen. Then, 3.7 g of aniline was added to this solution. Thereafter, 300 mL of 1M phosphoric acid was added to this solution, and the temperature of the solution having two liquid phases, i.e. toluene and water, was cooled to 5° C. When the internal temperature of the solution reached 5° C., stirring was conducted at 300 rpm. Then, a solution obtained by dissolving 7.32 g of ammonium persulfate in 100 mL of 1M phosphoric acid was added dropwise over 2 hours by means of a dropping funnel. For 18 hours after the start of the dropwise addition, the reaction was conducted while keeping the internal temperature of the solution at 5° C. Thereafter, 250 mL of toluene was added, the reaction temperature was elevated to 25° C., and the reaction was continued for 4 hours. Then, the reaction solution was allowed to stand and the solution was separated into two phases, and an aqueous phase was collected. A toluene phase was washed twice with 100 mL of ion exchange water, once with 100 mL of 1M phosphoric acid and further three times with 100 mL of ion exchange water, whereby a toluene solution of a polyaniline composite (protonated polyaniline) was obtained.

A slight amount of impurities contained in the resulting composite solution was removed by means of filter paper of #5B, whereby a toluene solution of the polyaniline composite was collected. The solution was then transferred to an evaporator, heated in a hot water bath of 60° C. By reducing the pressure, volatile matters were distilled off by evaporation, whereby 4.82 g of polyaniline composite was obtained.

The chorine content of the thus prepared polyaniline composite was measured by the organochlorine content-coulometric titration method. It was confirmed that the chlorine content was less than 5 wt ppm. Further, the weight-average molecular weight and the molecular weight distribution of the resulting polyaniline composite was measured in the same manner as in Example 1, and $P_{10000}/P_{ALL}$ was found to be 0.1704. The results are shown in Table 1.

For the polyaniline composites produced in Examples 1 to 6 and Comparative Examples 1 to 5, the following evaluation was conducted. The results are shown in Table 1.

[Measurement of Doping Ratio of Polyaniline]

0.25 g of the thus prepared polyaniline composite was dissolved in 4.75 g of toluene and 0.25 g of isopropyl alcohol. 250 mL of hexane was added to this solution and the resultant was stirred. Thereafter, the total amount was naturally filtered by means of filter paper of #5C, and the collected solid matters were dried under reduced pressure, whereby polyaniline for measuring the doping ratio was prepared.

The nitrogen atom and the sulfur atom contained in the polyaniline for measuring the doping ratio were measured by the high-frequency combustion and the CHN coder method, respectively.

By dissolving the polyaniline composite in toluene and by washing with hexane, Aerosol OT (diisooctyl sodium sulfosuccinate) with which polyaniline molecules were not doped could be removed. Therefore, the content of the sulfur atom obtained by the above-mentioned measurement indicates the doping amount.

[Measurement of Conductivity of Polyaniline]

0.1 g of the thus prepared polyaniline composites were dissolved in 1.9 g of toluene and 0.1 g of isopropyl alcohol. To the resulting solution, 0.8 g of m-cresol was added as the second dopant, and the resultant was stirred and mixed at 30° C. for 30 minutes, whereby a solution for measuring the conductivity was prepared.

On the upper surface of the glass substrate on which the ITO electrode 2 was formed by patterning (shown in FIG. 1), 1 ml of the solution for measuring the conductivity was applied by the spin coating method in the nitrogen atmosphere. In the spin coating method, the glass substrate rotation time after the dropwise addition of the conductive polyaniline composition on the glass substrate was 15 seconds. In addition, the glass substrate rotation speed of the spin coating method was 2000 rpm. Thereafter, the glass substrate was dried in the atmosphere of nitrogen (drying time: 5 minutes, drying temperature: 80° C.) to form a conductive polyaniline thin film.

Figure 4:
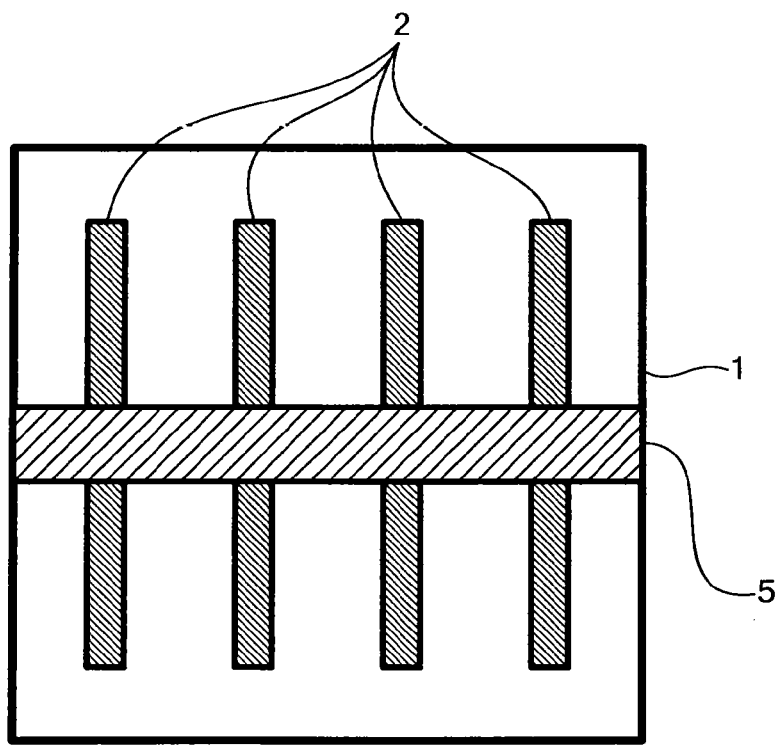
FIG. 4 is a view showing the upper surface of a glass substrate with the terminals of an ITO electrode being exposed on the surface by scraping a conductive polyaniline thin film.

For the conductive polyaniline thin film obtained by drying, as shown in FIG. 4, a part covering the terminals of the ITO electrode of the polyaniline composite thin film 5 was scraped off in the atmosphere of nitrogen, thereby to allow the terminals of the ITO electrode to be exposed on the surface. By using the terminals of the ITO electrode exposed on the surface, the conductivity was measured by the four-probe method by using a Loresta GP manufactured by Mitsubishi Chemical Analytech Co., Ltd.

[Heat Resistant Test at 125° C. of Conductive Polyaniline Thin Film]

1 ml of the solution for measuring the conductivity of polyaniline was applied to the upper surface of the glass substrate 1 on which the ITO electrode 2 was formed by patterning (shown in FIG. 1), by the spin coating in the nitrogen atmosphere. In the spin coating method, the glass substrate rotation time after the dropwise addition of the conductive polyaniline composition was 15 seconds. In addition, the glass substrate rotation speed of the spin coating method was 500 rpm. Thereafter, the glass substrate was dried in the atmosphere of nitrogen (drying time: 5 minutes, drying temperature: 80° C.) to form a conductive polyaniline thin film. After drying the conductive polyaniline thin film, as shown in FIG. 4, a part covering the terminals of the ITO electrode of the polyaniline thin film 5 was scraped off in the atmosphere of nitrogen, thereby to allow the terminals of the ITO electrode to be exposed to the surface. By using the terminals of the ITO electrode exposed on the surface, the resistance value of the thin film was measured by the four-probe method by using a Loresta GP manufactured by Mitsubishi Chemical Analytech Co., Ltd. The resistance value immediately after the film formation was allowed to be an initial value of $R_0$.

The resulting thin film of the conductive polyaniline composition was allowed to stand at 125° C. for 1200 hours in the nitrogen atmosphere together with the glass substrate. After the lapse of a specific period of time, the temperature of the thin film was returned to room temperature. Then, the resistance was measured in the same manner as in the case of the initial value of $R_0$. The ratio of the resistance $R_{1200}$ after the lapse of 1200 hours and the initial value $R_0$, i.e. $R_{1200}/R_0$, was calculated to evaluate the deterioration of the thin film with the passage of time (an increase ratio of the resistance) was evaluated.

TABLE 1

| | Conductivity [S/cm] | Weight-average molecular weight | $P_{10000}/P_{ALL}$ [%] | Molecular weight distribution | Chlorine content [mass %] | Doping ratio | $R_{1200}/R_0$ |
|---|---|---|---|---|---|---|---|
| Example 1 | 183 | 68700 | 9.6 | 2.9 | Less than 5 | 0.47 | 28 |
| Example 2 | 210 | 86800 | 5.1 | 2.5 | Less than 5 | 0.51 | 44 |
| Example 3 | 246 | 101000 | 7.4 | 3.6 | Less than 5 | 0.49 | 75 |
| Example 4 | 256 | 55500 | 9.5 | 2.3 | Less than 5 | 0.48 | — |

TABLE 1-continued

| | Conductivity [S/cm] | Weight-average molecular weight | $P_{10000}/P_{ALL}$ [%] | Molecular weight distribution | Chlorine content [mass %] | Doping ratio | $R_{1200}/R_0$ |
|---|---|---|---|---|---|---|---|
| Example 5 | 234 | 42900 | 13.8 | — | Less than 5 | — | — |
| Example 6 | 200 | 47100 | 13.6 | — | Less than 5 | — | — |
| Com. Ex. 1 | 131 | 51000 | 16.9 | 3.2 | Less than 5 | 0.45 | 82 |
| Com. Ex. 2 | 96 | 45100 | 23.4 | 3.6 | Less than 5 | 0.44 | 85 |
| Com. Ex. 3 | 46 | 21700 | 25.1 | 1.8 | Less than 5 | 0.45 | 126 |
| Com. Ex. 4 | 70 | 38000 | 24.9 | 2.9 | Less than 5 | 0.45 | 218 |
| Com. Ex. 5 | 63 | 95900 | 17.0 | — | Less than 5 | — | — |

INDUSTRIAL APPLICABILITY

The conductive composition comprising the polyaniline composite of the invention can be used, in the field of power electronics and optoelectronics, as an anti-static agent, a material for a transparent electrode and a conductive film, a material for an electroluminescence device, a circuit material, an electromagnetic wave shielding material, an electromagnetic wave absorbing material, a noise suppressing material, a dielectric and an electrolyte of a capacitor, a polar material of a solar battery and a secondary battery, a fuel battery separator material or the like, or as a plating undercoating, an anti-rust or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A polyaniline composite comprising substituted or unsubstituted polyaniline molecules and a proton donor,
the polyaniline molecules being doped with the proton donor,
the composite having a chlorine content of 0.6 wt % or less, and
the composite satisfying formula (1):

$$P_{10000}/P_{ALL} \leq 0.15 \quad (1)$$

wherein $P_{10000}$ is a total sum of weights of the polyaniline molecules in the polyaniline composite having a molecular weight of 10000 or less; and
$P_{ALL}$ is a total sum of weights of all polyaniline molecules in the polyaniline composite.

2. The polyaniline composite of claim 1, wherein a weight average molecular weight of the polyaniline molecules is 52000 or more.

3. The polyaniline composite of claim 1, wherein the proton donor is a compound represented by formula (I):

$$M(XARn)m \quad (I)$$

wherein M is a hydrogen atom, an organic free radical or an inorganic free radical; and m is a value of (valence of M)/(valence of X);
X is an anion group;
A is a hydrocarbon group which may comprise a substituent;
R is a group represented by —H, —R¹, —OR¹, —COR¹, —COOR¹, —(C=O)—(COR¹) or —(C=O)—(COOR¹);

R¹ is a hydrocarbon group which may have a substituent, a silyl group, an alkylsilyl group, a group represented by —(R²O)x-R³ or a group represented by —(OSiR³₂)x-OR³, wherein each R² is independently an alkylene group, each R³ is independently a hydrocarbon group and x is an integer of 1 or more; and
n is an integer of 1 or more.

4. The polyaniline composite of claim 1, wherein the proton donor is a compound represented by formula (III):

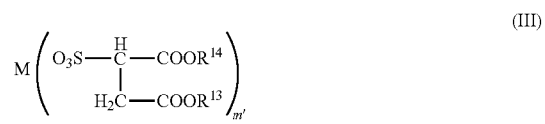

(III)

wherein M is a hydrogen atom, an organic free radical or an inorganic free radical and m' is a valence of M;
R¹³ and R¹⁴ are each independently a hydrocarbon group or a group represented by —(R¹⁵O)r-R¹⁶;
each R¹⁵ is independently a hydrocarbon group or a silylene group, R¹⁶ is a hydrogen atom, a hydrocarbon group or a group represented by R¹⁷₃Si—, and r is an integer of 1 or more; and
each R¹⁷ is independently a hydrocarbon group.

5. A solution comprising 1 g or more of the polyaniline composite of claim 1 dissolved in a mixed solvent of 95 g of toluene and 5 g of isopropyl alcohol at 25° C.

6. The polyaniline composite of claim 1, further comprising phosphorus.

7. A composition comprising the polyaniline composite of claim 1 and a solvent.

8. The composition of claim 7, further comprising a phenolic compound.

9. The composition of claim 7, further comprising a heat-resistant stabilizer.

10. A capacitor produced by using the composition of claim 7.

11. A shaped body produced by using the composition of claim 7.

12. A conductive stacked body comprising a substrate and a conductive layer produced by using the composition of claim 7,
the conductive layer being stacked on the substrate.

13. A capacitor comprising the polyaniline composite of claim 1.

14. A shaped body comprising the polyanilline composite of claim 1.

15. A conductive stacked body comprising a substrate and a conductive layer comprising the polyaniline composite of claim 1,
the conductor layer being stacked on the substrate.

16. A conductive article obtained by shaping the conductive stacked body of claim 15.

17. The polyaniline composite of claim 1, wherein a doping ratio of the proton donor to the polyaniline molecules is from 0.35 to 0.65.

18. A method for producing a polyaniline composite, the method comprising subjecting substituted or unsubstituted aniline to chemical oxidative polymerization in a solution comprising a proton donor, phosphoric acid and a non-ionic emulsifier which is different from the proton donor and having two liquid phases.

19. The method of claim 18, wherein the proton donor is a compound represented by formula (I):

M(XAR$n$)$m$     (I)

wherein M is a hydrogen atom, an organic free radical, or an inorganic free radical; and m is a value of (valence of M)/(valence of X);

X is an anion group;

A is a hydrocarbon group which may contain a substituent;

R is a group represented by —H, —R$^1$, —OR$^1$, —COR$^1$, —COOR$^1$, —(C=O)—(COR$^1$) or —(C=O)—(COOR$^1$);

R$^1$ is a hydrocarbon group which may have a substituent, a silyl group, an alkylsilyl group, a group represented by —(R$^2$O)x-R$^3$ or a group represented by —(OSiR$^3{}_2$)x-OR$^3$, wherein each R$^2$ is independently an alkylene group, each R$^3$ is independently a hydrocarbon group and x is an integer of 1 or more; and n is an integer of 1 or more.

20. The method of claim 18, wherein the proton donor is represented by formula (III):

wherein M is a hydrogen atom, an organic free radical or an inorganic free radical; and m' is a valence of M;

R$^{13}$ and R$^{14}$ are each independently a hydrocarbon group or a group represented by —(R$^{15}$O)r-R$^{16}$;

each R$^{15}$ is independently a hydrocarbon group or a silylene group, R$^{16}$ is a hydrogen atom, a hydrocarbon group or a group represented by R$^{17}{}_3$Si—, and r is an integer of 1 or more; and each R$^{17}$ is independently a hydrocarbon group.

21. A polyaniline composite obtained by the method of claim 18.

22. The method of claim 18, wherein an amount of the non-ionic emulsifier is from 0.001 to 0.1 mol relative to 1 mol of the aniline monomer.

* * * * *